(12) United States Patent
Natarajan et al.

(10) Patent No.: US 8,475,975 B2
(45) Date of Patent: Jul. 2, 2013

(54) METHOD OF RECORDING DATA IN AN OPTICAL DATA STORAGE MEDIUM AND AN OPTICAL DATA STORAGE MEDIUM

(75) Inventors: Arunkumar Natarajan, Niskayuna, NY (US); Eugene Pauling Boden, Scotia, NY (US); Dmitry Vladimirovich Dylov, Schenectady, NY (US); James Edward Pickett, Schenectady, NY (US); Evgenia Mikhailovna Kim, Ballston Lake, NY (US); Patrick Joseph McCloskey, Watervliet, NY (US); Kwok Pong Chan, Troy, NY (US); Victor Petrovich Ostroverkhov, Ballston Lake, NY (US); Matthew Jeremiah Misner, Delanson, NY (US); Vijay Krishna Paruchuru, Edison, NJ (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/164,996

(22) Filed: Jun. 21, 2011

(65) Prior Publication Data
US 2012/0328973 A1    Dec. 27, 2012

(51) Int. Cl.
*G03H 1/02*        (2006.01)

(52) U.S. Cl.
USPC .................. 430/1; 430/2; 430/340; 430/334; 359/3

(58) Field of Classification Search
None
See application file for complete search history.

(56) References Cited

U.S. PATENT DOCUMENTS 4,310,650 A * 1/1982 Gupta et al. .................. 526/313
5,658,706 A * 8/1997 Niki et al. ................. 430/270.1

(Continued)

FOREIGN PATENT DOCUMENTS

| EP | 1348575 | * 10/2003 |
| JP | 04-015201 | * 1/1992 |
| JP | 2005-099416 | * 4/2005 |

OTHER PUBLICATIONS

Ahn et al., "Fluorescent photoimaging with polymers having protected quinizarin dye precursors by a dry process based upon chemical amplification", React. Funct. Poly vol. 69 pp. 111-116 (2009).*

(Continued)

*Primary Examiner* — Martin Angebranndt
(74) *Attorney, Agent, or Firm* — Andrew J. Caruso

(57) ABSTRACT

In accordance with one aspect of the present invention, a method for recording holographic data in an optical data storage medium is provided. The method includes (i) providing an optical data storage medium including: (a) a thermoplastic polymer matrix, (b) a latent acid generator, (c) a non-linear sensitizer, and (d) a reactant including a latent chromophore. The method further includes (ii) irradiating a volume element of the optical data storage medium with an interference pattern, said interference pattern including an incident radiation having a wavelength and an intensity sufficient to cause upper triplet energy transfer from the non-linear sensitizer to the latent acid generator, thereby generating an acid, wherein the latent acid generator is substantially non-responsive to said incident radiation. The method furthermore includes (iii) reacting at least one protected chromophore with the acid generated to form at least one chromophore, thereby causing a refractive index change within the volume element; and (iv) producing within the irradiated volume element refractive index variations corresponding to the interference pattern, thereby producing an optically readable datum. An optical data storage medium is also provided.

26 Claims, 6 Drawing Sheets

U.S. PATENT DOCUMENTS

| | | | |
|---|---|---|---|
| 5,759,739 A * | 6/1998 | Takemura et al. | 430/270.1 |
| 6,322,931 B1 * | 11/2001 | Cumpston et al. | 430/1 |
| 6,969,578 B2 | 11/2005 | Robello et al. | |
| 7,102,802 B1 | 9/2006 | Erben et al. | |
| 7,459,263 B2 | 12/2008 | Farid et al. | |
| 7,524,590 B2 | 4/2009 | Erben et al. | |
| 7,678,507 B2 | 3/2010 | Cole et al. | |
| 7,771,915 B2 | 8/2010 | Akiba et al. | |
| 2004/0014833 A1 * | 1/2004 | Bradley | 522/6 |
| 2006/0188790 A1 * | 8/2006 | Takizawa | 430/1 |
| 2006/0194122 A1 * | 8/2006 | Takizawa | 430/1 |
| 2007/0207390 A1 * | 9/2007 | Takizawa et al. | 430/1 |
| 2010/0165819 A1 | 7/2010 | Shi et al. | |
| 2011/0051586 A1 * | 3/2011 | Natarajan et al. | 369/103 |
| 2011/0053054 A1 * | 3/2011 | Natarajan et al. | 430/2 |

OTHER PUBLICATIONS

Rogers et al., "Platinum acetylide two photon chromophores", Inorg. Chem., vol. 46(16) pp. 6483-6494 (2007).*

Kocher et al., "Latent untraviolet light absorbers", J. Mater. Chem., vol. 13 pp. 9-15 (2003).*

Min et al., "patterned fluorescent images with a t-BOC protected coumarin derivative", Macromol. Res., vol. 12(6) pp. 615-617 (2004).*

Zhou et al.l, "An efficient two-photon generated photoacid applied to positive tone 3D microfabrication", Science vol. 296 pp. 1106-1109 (2002).*

Lee et al., Color and fluorescent imaging of t-BOC protected quinizarin methacrylate polymers, Chem. Mater., vol. 14(11) pp. 4572-4575 (2002).*

Yu et al., Chemically amplified positive resists for two-photon three dimensional microfabrication, Adv. Mater., vol. 15(6) pp. 517-521 (2003).*

Li et al., "Coumarin derivatives with enhanced two photon absorption cross-sections", Dyes & Pigments, vol. 74 pp. 108-112 (2007).*

Weiss et al., "Polymeric holographic recording media: in-situ and real-time characterization", Proc. SPIE vol. 2688, pp. 11-21 (1996).*

Farsari et al., "Two-photon polymerization of an Eosin Y sensitized acrylate composite", J. Photochem. Photobiol. A: Chem., vol. 181 pp. 132-135 (Dec. 2005).*

Gao et al., "Dye sensitized photopolymerization of methyl methacrylate initiatoed by coumarin dye/iodonium salt system", Chin. J. Poly. Sci., vol. 17(6) pp. 589-594 (1999).*

Specht et al., "Ketocoumarins: a new class of photosensitizers", Tetrahedron vol. 38(9) pp. 1203-1211 (1982).*

Donovan, "Ultraviolet multiphoton excitation formation and kinetic studies of electronic excited atamos and free radicals", in Gas Kinbetics and Energy transfer, vol. 4, Ashmore, Ed., pp. 117-125 (1981).*

Robello et al., "Refractive Index Imaging via a Chemically Amplified Process in a Solid Polymeric Medium", SPIE Proceedings, Feb. 23, 2006, vol. 6117, 8 Pages.

* cited by examiner

METHOD OF RECORDING DATA IN AN OPTICAL DATA STORAGE MEDIUM AND AN OPTICAL DATA STORAGE MEDIUM

BACKGROUND

1. Technical Field

The present disclosure relates to method of recording data in an optical data storage medium. More particularly, the present disclosure relates to method of recording microholographic data in a holographic storage medium.

2. Discussion of Related Art

Holographic storage is optical data storage in which the data is represented as holograms, which are images of three dimensional interference patterns created by the intersection of two beams of light in a photosensitive medium. More particularly, the superposition of a reference beam and a signal beam, containing digitally encoded data, forms a 3-D interference pattern within the volume of the medium resulting in a chemical reaction that changes or modulates the refractive index of the photosensitive medium (recording or writing step). This modulation records both the intensity and phase information from the signal as the hologram. The hologram can later be retrieved by exposing the storage medium to the reference beam alone, which interacts with the stored holographic data to generate a reconstructed signal beam proportional to the initial signal beam used to store the holographic image (reading step).

Recent research into holographic data storage has focused on a bit-wise approach for recording data, where each bit (or few bits) of information is represented by a hologram localized to a microscopic volume within a medium to create a region that reflects the readout light. Such localized volume holographic micro-reflectors may be arranged into multiple data layers throughout the volume of the medium. Materials capable of accommodating a bit-wise data storage approach are highly sought after as the equipment utilized to read and write to such material is either currently commercially available, or readily provided with modifications to commercially available reading and writing equipment.

However, conventional methods of storing bit-wise holographic data employ linear photosensitive materials or materials susceptible to photochemical change independent of the power density (intensity) of incident radiation. These linear materials are also susceptible to photochemical change at both the writing and reading conditions. Moreover, in the bit-wise approach, the readout and recording of data in the layers inevitably leads to exposure of the adjacent layers to the recording/readout radiation. Therefore, conventional methods of recording/reading bit-wise holographic medium using linear materials could lead to unintended erasure or data loss in the medium during recording/reading.

Thus, there is a need for methods of recording data in a holographic storage medium data without affecting other layers of data during the writing step. Further, for bit-wise approach of recording holographic data, there is a need to have separate write and read conditions, such that the reading step does not adversely affect the recorded data.

BRIEF DESCRIPTION

In accordance with one aspect of the present invention, a method for recording holographic data in an optical data storage medium is provided. The method includes (i) providing an optical data storage medium including: (a) a thermoplastic polymer matrix, (b) a latent acid generator, (c) a non-linear sensitizer, and (d) a reactant including a latent chromophore. The method further includes (ii) irradiating a volume element of the optical data storage medium with an interference pattern, said interference pattern comprising an incident radiation having a wavelength and an intensity sufficient to cause upper triplet energy transfer from the non-linear sensitizer to the latent acid generator, thereby generating an acid, wherein the latent acid generator is substantially non-responsive to said incident radiation. The method furthermore includes (iii) reacting at least one protected chromophore with the acid generated to form at least one chromophore, thereby causing a refractive index change within the volume element; and (iv) producing within the irradiated volume element refractive index variations corresponding to the interference pattern, thereby producing an optically readable datum.

In accordance with another aspect of the present invention a method for recording holographic data in an optical data storage medium is provided. The method includes (i) providing an optical data storage medium comprising: (a) a thermoplastic polymer matrix, (b) a latent acid generator, (c) a non-linear sensitizer, and (d) a reactant comprising a protected benzophenone. The method further includes (ii) irradiating a volume element of the optical data storage medium with an interference pattern, said interference pattern comprising an incident radiation having a wavelength and an intensity sufficient to cause upper triplet energy transfer from the non-linear sensitizer to the latent acid generator, thereby generating an acid, wherein the latent acid generator is substantially non-responsive to said incident radiation. The method furthermore includes (iii) reacting a plurality of protected benzophenones with the acid generated to form a plurality of hydroxy benzophenones, thereby causing a refractive index change within the volume element, and (iv) producing within the irradiated volume element refractive index variations corresponding to the interference pattern, thereby producing an optically readable datum.

In accordance with yet another aspect of the present invention, an optical data storage medium is provided. The optical data storage medium includes (a) a thermoplastic polymer matrix; (b) a non-linear sensitizer capable of absorbing incident radiation having a wavelength and an intensity sufficient to cause upper triplet excitation; (b) a latent acid generator capable of generating an acid upon triplet excitation from the non-linear sensitizer and being substantially non-responsive to said incident radiation; (d) a reactant including a latent chromophore, wherein at least one latent chromophore is capable of forming at least one chromophore by reacting with the acid generated, thereby causing a refractive index change in the optical data storage medium. In some embodiments, pluralities of latent chromophores are capable of forming a plurality of chromophores for each acid generated.

Other embodiments, aspects, features, and advantages of the invention will become apparent to those of ordinary skill in the art from the following detailed description, the accompanying drawings, and the appended claims.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
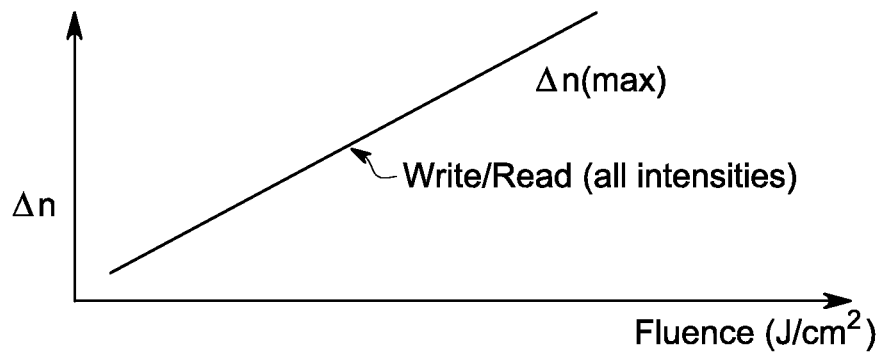
FIG. 1A is a graphical depiction of the response of a linear sensitizer to actinic radiation.

As discussed in detail below, embodiments of the present invention include a method suitable for recording holographic data in an optical data storage medium using a bit-wise approach.

The optical data storage medium includes a thermoplastic polymer matrix, a non-linear sensitizer, a latent acid generator, and a latent chromophore. The non-linear sensitizer is capable of transferring triplet energy to the latent acid generator and subsequently generating an acid only when the incident radiation has an intensity greater than a threshold value. The acid generated reacts with the latent chromophore forming a chromophore resulting in refractive index change within the medium. However, the latent acid generator and the latent chromophore are individually non-responsive to the incident radiation, and the non-linear sensitizer is non-responsive if the intensity is lower than a threshold value. Accordingly, the medium desirably exhibits a nonlinear response to incident radiation, that is, experiences no change in refractive index for incident radiation having an intensity below a threshold value, and significant changes in refractive index above the threshold value.

Advantageously, while recording into such a medium is only possible with the incident radiation having intensity exceeding a threshold value, the recorded data can be repeatedly and substantially non-destructively read with radiation having an intensity below the threshold value. Further, the method advantageously allows for recording of holographic data in multiple layers in a bit-wise manner without adversely affecting the data recorded in the other layers.

Further, embodiments of the present invention include a method of recording holographic data in a bit-wise manner by chemical amplification. According to some embodiments of the invention, for each acid generated a plurality of latent chromophores are converted to chromophores resulting in a larger refractive index change in the medium. Thus, the method advantageously allows quantum efficiency (QE) of 1 or more while utilizing fewer photons or lower power density.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise.

As defined herein, the term "optically transparent" as applied to an optically transparent substrate or an optically transparent material means that the substrate or material has an absorbance of less than 1. That is, at least 10 percent of incident light is transmitted through the material at at least one wavelength in a range between about 300 nanometers and about 1500 nanometers. For example, when configured as a film having a thickness suitable for use in holographic data storage medium said film exhibits an absorbance of less than 1 at at least one wavelength in a range between about 300 nanometers and about 1500 nanometers.

As used herein, the term "volume element" means a three dimensional portion of a total volume.

As used herein, the term "optically readable datum" refers to a datum that is stored as a hologram patterned within one or more volume elements of holographic data storage medium.

As used herein, the term "diffraction efficiency" means a fraction of the beam power reflected by a hologram as measured at the hologram location with respect to the incident probe beam power, while the term "quantum efficiency" means a probability of an absorbed photon to result in a chemical change that produces a refractive index change.

As used herein, the term "fluence" means the amount of optical beam energy that has traversed a unit area of the beam cross-section (measured, for example, in Joule/cm$^2$), while the term "intensity" means optical radiative flux density, e.g. amount of energy traversing a unit area of beam cross-section in unit time (measured in, for example, Watt/cm$^2$).

As used herein, the term "sensitivity" is defined as the amount of index change obtained with respect to the amount of fluence used to irradiate a spot of the film with the laser light. If we know the fluence (F) value and the amount of index change we can estimate sensitivity (S) of the energy transfer process using the formula:

$$\text{Sensitivity} = dn/F$$

wherein
dn=percentage conversion×dn (max), dn (max) is the maximum capacity index change material;
F=actual fluence.

As used herein, the term "aromatic radical" refers to an array of atoms having a valence of at least one including at least one aromatic group. The array of atoms having a valence of at least one including at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which includes a phenyl ring (the aromatic group) and a methylene group (the nonaromatic component). Similarly a tetrahydronaphthyl radical is an aromatic radical including an aromatic group ($C_6H_3$) fused to a nonaromatic component —($CH_2$)$_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical including a methyl group, the methyl group being a functional group which is an alkyl group. Similarly, the 2-nitrophenyl group is a $C_6$ aromatic radical including a nitro group, the nitro group being a functional group. Aromatic radicals include halogenated aromatic radicals such as 4-trifluoro methyl phenyl, hexafluoro isopropylidene bis(4-phen-1-yloxy) (i.e., —OPhC($CF_3$)$_2$PhO—); 4-chloromethylphen-1-yl, 3-trifluorovinyl-2-thienyl, 3-trichloro methylphen-1-yl (i.e., 3-$CCl_3$Ph-); 4-(3-bromoprop-1-yl)phen-1-yl (i.e., 4-$BrCH_2CH_2CH_2$Ph-); and the like. Further examples of aromatic radicals include 4-allyloxyphen-1-oxy; 4-aminophen-1-yl (i.e., 4-$H_2$NPh-); 3-aminocarbonylphen-1-yl (i.e., $NH_2$COPh-); 4-benzoylphen-1-yl; dicyano methylidene bis(4-phen-1-yl oxy) (i.e., —OPhC(CN)$_2$PhO—); 3-methylphen-1-yl, methylene bis(4-phen-1-yl oxy) (i.e., —OPhCH$_2$PhO—); 2-ethylphen-1-yl; phenyl ethenyl, 3-formyl-2-thienyl, 2-hexyl-5-furanyl; hexamethylene-1,6-bis(4-phen-1-yl oxy) (i.e., —OPh(CH$_2$)$_6$PhO—); 4-hydroxy methylphen-1-yl (i.e., 4-HOCH$_2$Ph-); 4-mercapto methylphen-1-yl (i.e., 4-HSCH$_2$Ph-); 4-methylthiophen-1-yl (i.e., 4-$CH_3$SPh-); 3-methoxyphen-1-yl; 2-methoxy carbonyl phen-1-yl oxy (e.g., methyl salicyl); 2-nitromethylphen-1-yl (i.e., 2-$NO_2CH_2$Ph); 3-trimethylsilylphen-1-yl; 4-t-butyl dimethylsilylphenl-1-yl; 4-vinylphen-1-yl; vinylidene bis (phenyl); and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and including an array of atoms which is cyclic but which is not aromatic. As defined herein a "cycloaliphatic radical" does not contain an aromatic group. A "cycloaliphatic radical" may include one or more noncyclic components. For example, a cyclohexylmethyl group ($C_6H_{11}CH_2$—) is a cycloaliphatic radical which includes a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methyl cyclopent-1-yl radical is a $C_6$ cycloaliphatic radical including a methyl group, the methyl group being a functional group which is an alkyl group. Similarly, the 2-nitrocyclobut-1-yl radical is a $C_4$ cycloaliphatic radical including a nitro group, the nitro group being a functional group. A cycloaliphatic radical may include one or more halogen atoms which may be the same or different. Halogen atoms include, for example; fluorine, chlorine, bromine, and iodine. Cycloaliphatic radicals including one or more halogen atoms include 2-trifluoro methylcyclohex-1-yl; 4-bromo difluoro methyl cyclo oct-1-yl; 2-chloro difluoro methylcyclohex-1-yl; hexafluoro isopropylidene-2, 2-bis(cyclohex-4-yl) (i.e., —$C_6H_{10}$C($CF_3$)$_2$$C_6H_{10}$—); 2-chloro methylcyclohex-1-yl; 3-difluoro methylene cyclohex-1-yl; 4-trichloro methyl cyclohex-1-yloxy; 4-bromo dichloro methylcyclohex-1-yl thio; 2-bromo ethyl cyclopent-1-yl; 2-bromo propyl cyclo hex-1-yloxy (e.g., $CH_3$CHBr$CH_2$$C_6H_{10}$O—); and the like. Further examples of cycloaliphatic radicals include 4-allyl oxycyclo hex-1-yl; 4-amino cyclohex-1-yl (i.e., $H_2$N$C_6H_{10}$—); 4-amino carbonyl cyclopent-1-yl (i.e., $NH_2$CO$C_5H_8$—); 4-acetyl oxycyclo hex-1-yl; 2,2-dicyano isopropylidene bis(cyclohex-4-yloxy) (i.e., —O$C_6H_{10}$C(CN)$_2$$C_6H_{10}$O—); 3-methyl cyclohex-1-yl; methylene bis(cyclohex-4-yloxy) (i.e., —O$C_6H_{10}$CH$_2$$C_6H_{10}$O—); 1-ethyl cyclobut-1-yl; cyclopropyl ethenyl, 3-formyl-2-terahydrofuranyl; 2-hexyl-5-tetrahydrofuranyl; hexamethylene-1,6-bis (cyclohex-4-yloxy) (i.e., —O$C_6H_{10}$(CH$_2$)$_6$$C_6H_{10}$O—); 4-hydroxy methylcyclohex-1-yl (i.e., 4-HOCH$_2$$C_6H_{10}$—), 4-mercapto methyl cyclohex-1-yl (i.e., 4-HSCH$_2$$C_6H_{10}$—), 4-methyl thiocyclohex-1-yl (i.e., 4-$CH_3$S$C_6H_{10}$—); 4-methoxy cyclohex-1-yl, 2-methoxy carbonyl cyclohex-1-yloxy (2-$CH_3$OCOC$_6H_{10}$O—), 4-nitro methyl cyclohex-1-yl (i.e., $NO_2CH_2$$C_6H_{10}$—); 3-trimethyl silyl cyclohex-1-yl; 2-t-butyl dimethylsilylcyclopent-1-yl; 4-trimethoxy silylethyl cyclohex-1-yl (e.g., ($CH_3$O)$_3$SiCH$_2$CH$_2$$C_6H_{10}$—); 4-vinyl cyclohexen-1-yl; vinylidene bis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7$O—) represents a $C_4$ cycloaliphatic radical. The cyclohexylmethyl radical ($C_6H_{11}CH_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to include at least one carbon atom. The array of atoms including the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical including a methyl group, the methyl group being a functional group which is an alkyl group. Similarly, the 4-nitrobut-1-yl group is a $C_4$ aliphatic radical including a nitro group, the nitro group being a functional group. An aliphatic radical may be a haloalkyl group which includes one or more halogen atoms which may be the same or different. Halogen atoms include, for example; fluorine, chlorine, bromine, and iodine. Aliphatic radicals including one or more halogen atoms include the alkyl halides trifluoromethyl; bromodifluoromethyl; chlorodifluoromethyl; hexafluoroisopropylidene; chloromethyl; difluorovinylidene; trichloromethyl; bromodichloromethyl; bromoethyl; 2-bromotrimethylene (e.g., —$CH_2$CHBr$CH_2$—); and the like. Further examples of aliphatic radicals include allyl; aminocarbonyl (i.e., —CONH$_2$); carbonyl; 2,2-dicyano isopropylidene (i.e., —$CH_2$C(CN)$_2$$CH_2$—); methyl (i.e., —$CH_3$); methylene (i.e., —$CH_2$—); ethyl; ethylene; formyl (i.e., —CHO); hexyl; hexamethylene; hydroxymethyl (i.e., —CH$_2$OH); mercaptomethyl (i.e., —CH$_2$SH); methylthio (i.e., —SCH$_3$); methylthiomethyl (i.e., —CH$_2$SCH$_3$); methoxy; methoxycarbonyl (i.e., CH$_3$OCO—); nitromethyl (i.e., —CH$_2$NO$_2$); thiocarbonyl; trimethylsilyl (i.e., (CH$_3$)$_3$Si—); t-butyldimethylsilyl; 3-trimethyoxysilylpropyl (i.e., (CH$_3$O)$_3$SiCH$_2$CH$_2$CH$_2$—); vinyl; vinylidene; and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH$_2$)$_9$—) is an example of a C$_{10}$ aliphatic radical.

As noted earlier, a method of recording holographic data in an optical data storage medium is provided. The method includes providing an optical data storage medium including (a) a thermoplastic polymer matrix, (b) a latent acid generator, (c) a non-linear sensitizer, and (d) a reactant including a latent chromophore.

As used herein, the term "non-linear sensitizer" refers to a material that has a sensitivity having dependence to the light intensity, that is, the sensitivity is high at the high (recording) intensity and low at the lower (readout) intensity. For example, in a situation where the read intensity is about 20 to about 50 times lower than the write intensity, the sensitivity (based on specific assumptions on the readout life time and/or number of readout cycles the material has to survive) may decrease by an order greater than about 10$^4$ times to about 10$^5$ times the initial sensitivity. This difference in the intensity and sensitivity constitutes the amount of nonlinearity the material has to exhibit. The terms "non-linear sensitizer" and "sensitizer" are used herein interchangeably.

Figure 1B:
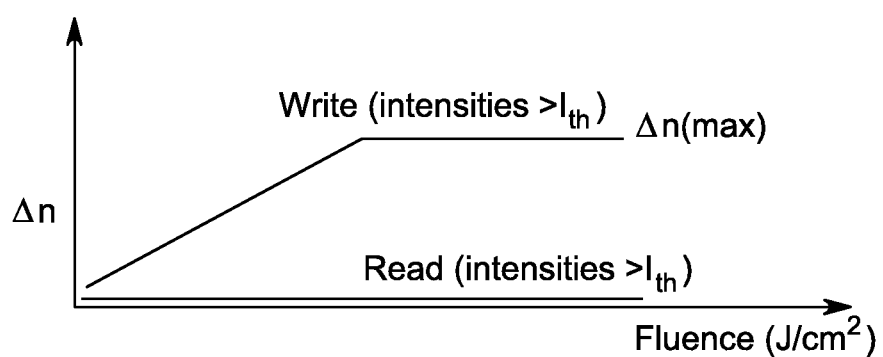
FIG. 1B is a graphical depiction of the response of a non-linear sensitizer to actinic radiation.

This is further illustrated in FIGS. 1A and 1B. FIG. 1A shows the response of a linear photosensitive material to incident radiation, while FIG. 1B shows the response of a non-linear sensitizer to incident radiation. As is shown in FIG. 1A, linear photosensitive materials may cause a reaction at any power density (intensity) of recording light and the amount of the refractive index change (Δn) achieved may be the same for the same radiative energy (fluence) received by the material. In contrast, non-linear sensitizers may only cause a reaction at and over a certain light intensity of recording light.

As noted earlier, the non-linear sensitizers are capable of absorbing incident radiation, for example in the form of one or more photons, and then transferring the energy to the latent acid generator to generate an acid. In some embodiments, the non-linear sensitizers may absorb two photons, typically, sequentially. Further in some embodiments, once the sensitizers described herein transfer the absorbed energy to the latent acid generator, they return to their original state, and may repeat the process many times over. The sensitizers thus do not get substantially consumed over time, although their ability to absorb energy and release it to one or more latent acid generators may degrade over time. This is in contrast to materials known conventionally as photosensitive materials, which can absorb energy (typically a single photon) and not transfer it to other molecules, but undergo conversion to a new structure, or react with another molecule to form a new compound in doing so.

In one embodiment, the non-linear sensitizers include reverse saturable absorbers (RSAs). As used herein, the term "reverse saturable absorber" or "RSA" refers to a compound that has extremely low linear absorption at a given wavelength, and transmits nearly all of the light at this wavelength. However, when subjected to high intensity radiation at these given wavelengths, low level linear absorption can lead to a state where the molecule has a higher absorption cross section and becomes highly absorbing at that same wavelength; causing it to strongly absorb subsequent photons. This nonlinear absorption is often referred to as sequential two-photon absorption.

Suitable examples of non-linear sensitizers include RSAs that experience photoexcitation when irradiated upon by incident radiation having a wavelength of about 532 nanometers. Because this wavelength is within the green color portion of the visible spectrum, these RSA's may typically be referred to as "green" RSA's. Other suitable examples of non-linear sensitizers include RSA's capable of undergoing photoexcitation upon irradiation with incident radiation at a wavelength of about 405 nanometers, or "blue" RSA's.

In one embodiment, the non-linear sensitizer includes a reverse saturable absorber capable of absorbing incident radiation at a wavelength in a range from about 300 nanometers to about 532 nanometers. In one particular embodiment, the non-linear sensitizer includes a reverse saturable absorber capable of absorbing incident radiation at a wavelength in a range from about 360 nanometers to about 500 nanometers. In one particular embodiment, the non-linear sensitizer essentially includes a reverse saturable absorber capable of absorbing incident radiation at a wavelength of about 405 nanometers to cause upper triplet-to-triplet energy transfer to the latent acid generator. In one embodiment, the non-linear sensitizer is capable of exhibiting reverse saturable absorber characteristics at 405 nanometers so that the storage capacity of the media is optimized, while the media is yet compatible with current conventional storage formats, for example, Blu-ray.

As noted earlier, the non-linear sensitizers suitable for use in optical storage medium of the present invention are capable of absorbing incident radiation in the above-mentioned wavelength range only if the intensity of incident radiation is greater than a threshold value. In one embodiment, the threshold value above which the non-linear sensitizer is capable of initiating an index chain reaction is in a range from about 20 MW/cm$^2$ to about 300 MW/cm$^2$. In one embodiment, the threshold value above which the non-linear sensitizer is capable of initiating an index chain reaction is in a range from about 50 MW/cm$^2$ to about 300 MW/cm$^2$.

Further, the non-linear sensitizers are substantially non-responsive to incident radiation in the above-mentioned wavelength range if the intensity is substantially lower than the threshold value. In one embodiment, the threshold value below which the non-linear sensitizer is substantially unreactive is in a range from about 5 MW/cm$^2$ to about 50 MW/cm$^2$. In one embodiment, the threshold value below which the non-linear sensitizer is substantially unreactive is in a range from about 5 MW/cm$^2$ to about 20 MW/cm$^2$.

In one embodiment, the method includes selecting a non-linear sensitizer having low absorbance or extinction coefficient at a wavelength in a range from about 300 nanometers to about 532 nanometers. In one embodiment, the method includes selecting a non-linear sensitizer having an extinction coefficient less than about 200 cm$^{-1}$M$^{-1}$ at a wavelength in a range from about 360 nanometers to about 500 nanometers. In one embodiment, the method includes selecting a non-linear sensitizer having an extinction coefficient less than about 200 cm$^{-1}$M$^{-1}$ at a wavelength of about 405 nanometers. In one embodiment, the method includes selecting a non-linear sensitizer having low ground state absorption and very high excited state absorption (RSA property) at a wavelength of about 405 nanometers.

In some embodiments, the non-linear sensitizer includes a platinum ethynyl complex. In some embodiments, the nonlinear sensitizer includes a trans platinum ethynyl complex. In one embodiment, the non-linear sensitizer includes bis(tributylphosphine)bis(4-ethynylbiphenyl)platinum (PPE), bis(tributylphosphine)bis(4-ethynyl-1-(2-phenylethynyl) benzene)platinum (PE2), bis(1-ethynyl-4-(4-n-butylphenyl-ethynyl)benzene)bis(tri-n-butyl)phosphine)Pt (II), (n-Bu-PE2), bis(1-ethynyl-4-(4-fluorophenylethynyl)benzene)bis(tri-n-butyl)phosphine)Pt(II) (F-PE2), bis(1-ethynyl-4-(4-methoxyphenylethynyl)benzene) bis(tri-n-butyl)phosphine) Pt(II) (MeO-PE2), bis(1-ethynyl-4-(4-methylphenylethynyl) benzene) bis(tri-n-butyl)phosphine)Pt (II) (Me-PE2), bis(1-ethynyl-4(3,5-dimethoxyphenylethynyl)benzene)bis(tri-nbutylphosphine)Pt(II) (3,5-diMeO-PE2), bis(1-ethynyl-4 (4-N,N-dimethylaminophenylethynyl)benzene)bis(tri-n-butyl-phosphine)Pt(II) (DMA-PE2), or combinations thereof.

In some embodiments, the non-linear sensitizer includes bis(tributylphosphine)bis(4-ethynyl-1-methoxy benzene) platinum (PE1-OMe), bis(tributylphosphine)bis(4-ethynyl-1-fluoro benzene)platinum (PE1-F), bis(tributylphosphine) bis(4-ethynyl-1-methyl benzene)platinum (PE1-Me), bis (tributylphosphine)bis(4-ethynyl-2,5-methoxy benzene) platinum (PE1-(OMe)$_2$), or combinations thereof. The non-linear sensitizer or reverse saturable absorbing molecules listed herein are exemplary, and many more varieties of reverse saturable absorbing molecules or other molecules exhibiting non-linear absorption may be used in the optical data storage media disclosed herein.

As used herein, the term "latent acid generator" refers to a material capable of generating acid or proton when exposed to a stimulus. In one embodiment, the latent acid generator is capable of generating an acid upon triplet energy transfer from the non-linear sensitizer to the latent acid generator. In certain embodiments, the latent acid generator is capable of generating an acid only upon triplet energy transfer from the non-linear sensitizer and is otherwise substantially non-responsive to said incident radiation. The term "non-responsive" as used herein means that the latent acid generator is substantially transparent to or does not absorb the incident radiation irradiated onto the optical storage medium during the recording or writing step. Accordingly, a latent acid generator, according to some embodiments, is substantially non-responsive to the incident radiation and does not generate an acid in the absence of the non-linear sensitizer. This is in contrast to photo-resist systems, wherein a "photo-acid generator" is employed and the photo-acid generator is capable of directly generating an acid upon exposure to radiation.

Figure 3:
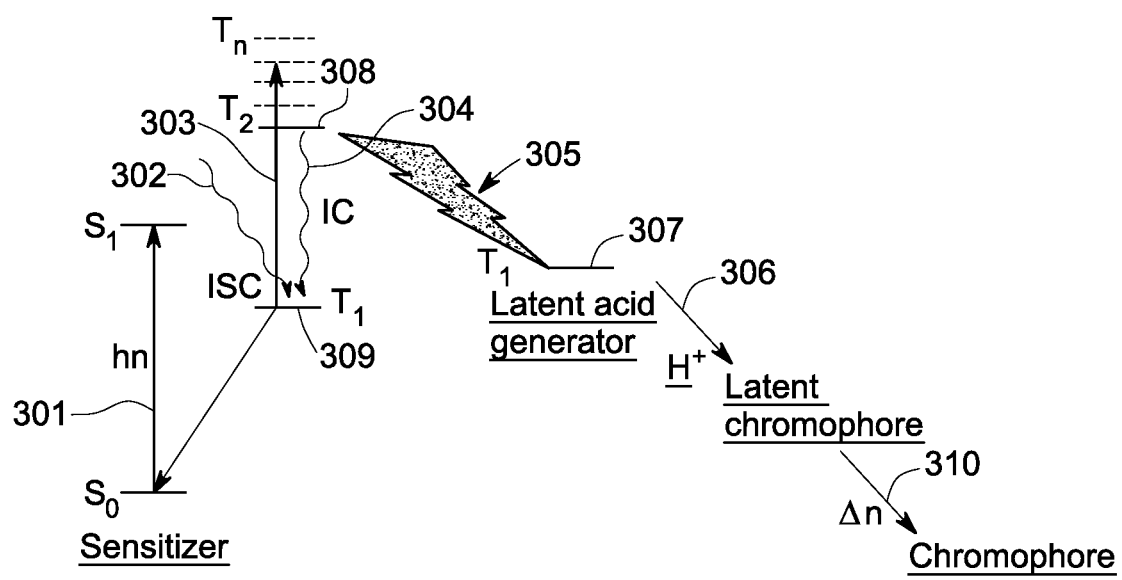
FIG. 3 is a schematic energy level diagram showing the upper triplet $T_n$ excited state absorption and resulting energy transfer for a non-linear sensitizer exhibiting reverse saturable absorption.

Referring to FIG. 3, a schematic energy level diagram 300 is provided. The diagram 300 shows the upper triplet $T_n$ excited state absorption and resulting energy transfer for a sensitizer exhibiting reverse saturable absorption. The latent acid generators used in the present optical data storage media have a triplet energy denoted by arrow 307 below that of the $T_2$ state of the sensitizer denoted by arrow 308, but above that of the $T_1$ state of the sensitizer, shown at arrow 309. The latent acid generators are also capable of receiving energy from an upper triplet state ($T_2$ or higher) of the sensitizer, and undergoing a reaction to generate an acid, which reacts with the latent chromophore to form a chromophore providing a refractive index change within the polymer matrix and thus, a recorded hologram.

In one embodiment, the method includes selecting a latent acid generator capable of generating an acid upon triplet acid excitation from the sensitizer and the latent acid generator being substantially non-responsive to the incident radiation employed during the writing step. In one, the method includes selecting a latent acid generator having a triplet energy below that of the $T_2$ state of the sensitizer and above that of the $T_1$ state of the sensitizer.

Further, in one embodiment, the method includes selecting a latent acid generator having low absorbance or extinction coefficient at a wavelength in a range from about 300 nanometers to about 532 nanometers. In one particular embodiment, the method includes selecting a latent acid generator having low absorbance or extinction coefficient at a wavelength in a range from about 360 nanometers to about 500 nanometers. In one particular embodiment, the method includes selecting a latent acid generator having low absorbance or extinction coefficient at a wavelength of about 405 nanometers.

In one embodiment, the latent acid generator is selected from the group consisting of sulfonium salts, iodonium salts, sulfonates, triflate, and combinations thereof. Non limiting examples of suitable latent acid generators include (4-bromophenyl)diphenylsulfonium triflate, (4-chlorophenyl) diphenylsulfonium triflate, (4-fluorophenyl)diphenylsulfonium triflate, (4-iodophenyl)diphenylsulfonium triflate, (4-methoxyphenyl)diphenylsulfonium triflate, (4-methylphenyl)diphenylsulfonium triflate, (4-methylthiophenyl) methyl phenyl sulfonium triflate, (4-phenoxyphenyl)diphenylsulfonium triflate, (4-phenylthiophenyl) diphenylsulfonium triflate, (4-tert-butylphenyl) diphenylsulfonium triflate, (tert-butoxycarbonylmethoxynaphthyl)-diphenylsulfonium triflate, Boc-methoxyphenyldiphenylsulfonium triflate, triphenylsulfonium triflate, bis(4-tert-butylphenyl)iodonium p-toluenesulfonate, bis(4-tert-butylphenyl)iodonium perfluoro-1-butanesulfonate, bis(4-tert-butylphenyl)iodonium triflate, diphenyliodonium hexafluorophosphate, diphenyliodonium nitrate, diphenyliodonium p-toluenesulfonate, diphenyliodonium perfluoro-1-butanesulfonate, diphenyliodonium triflate, 2-(4-methoxystyryl)-4,6-bis(trichloromethyl)-1,3,5-triazine, N-hydroxynaphthalimide triflate, N-hydroxy-5-norbornene-2,3-dicarboximide perfluoro-1-butanesulfonate, triphenylsulfonium perfluoro-1-butanesulfonate, tris(4-tert-butylphenyl)sulfonium perfluoro-1-butanesulfonate, tris(4-tert-butylphenyl)sulfonium triflate, triarylsulfonium hexafluorophosphate, and combinations thereof.

As used herein the term "reactant" refers to a material capable of undergoing a chemical change to form a "product", which results in modulation of refractive index change within the medium. In one embodiment, the reactant includes a latent chromophore. As used herein, the term "latent chromophore" refers to a material capable of generating a chromophore in response to a stimulus. Further, the term "latent chromophore" refers to a material capable of generating a chromophore, which has an absorption or optical characteristics different from the latent chromophore. Accordingly, during recording of holograph or the writing step, generation of chromophores leads to regional variations in concentrations of the reactants (latent chromophores) and products (chromophores) and accordingly localized modulation of the refractive index.

This is in contrast to photopolymer-based recording of optical data storage medium where modulation of refractive index is affected by polymerization of a monomer, which may lead to dimensional changes of the optical data storage medium. Further, this is in contrast to photoresist systems where the reactant is rendered soluble/insoluble in the presence of an acid, but the refractive index is not modulated.

In one embodiment, the latent chromophore is substantially non-responsive to the incident radiation during the recording/writing step. Further, in some embodiments, the latent chromophore is only capable of generating a chromophore indirectly, for example, when contacted with an acid, and does not generate a chromophore when directly exposed to the incident radiation. Accordingly, the latent chromophore is substantially non-responsive to the incident irradiation in the absence of the nonlinear sensitizer or the latent acid generator.

In one embodiment, the latent chromophore includes a protected chromophore. The term "protected chromophore" as used herein refers to a chromophore molecule substituted with a protecting group. The term "protecting group" as used herein refers to any group which, when bound to a hydroxyl, nitrogen, or other heteroatom on the latent chromophore molecule prevents undesired reactions from occurring at this group and which may be removed by acid catalyzed deprotection to generate the 'unprotected' hydroxyl, nitrogen, or other heteroatom group. In some embodiments, the protecting group includes esters such as tert-butyloxycarbonyl (t-BOC) or acetals and ketals such as methoxy methyl ether (MOM) group. In one embodiment, the latent chromophore includes an acid labile group or a group susceptible to cleavage when subjected to an acid or proton.

In one embodiment, the latent chromophore includes a protected benzophenone. The term "protected benzophenone" as used herein refers to benzophenone molecule substituted with a protecting group. In one embodiment, the latent chromophore includes a benzophenone molecule substituted with an acid labile group or a group susceptible to cleavage when subjected to an acid or proton. In one embodiment, the chromophore formed from the latent chromophore includes a hydroxy-benzophenone.

In one embodiment, the latent chromophore includes a moiety having a structural formula (I):

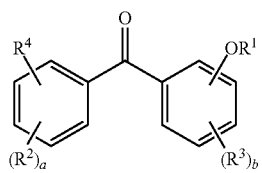

(I)

wherein "a" is an integer from 1 to 5 and "b" is an integer from 1 to 4;
$R^1$ is a protecting group;
$R^2$ and $R^3$ are independently at each occurrence hydrogen, halogen, a $C_1$-$C_{20}$ aliphatic radical, a $C_3$-$C_{20}$ cycloaliphatic radical, or a $C_2$-$C_3$(O)aromatic radical;
and $R^4$ is hydrogen or $OR^1$. Protecting group is as defined hereinabove.

In one embodiment, the latent chromophore includes a moiety having a structural formula (II) to (V):

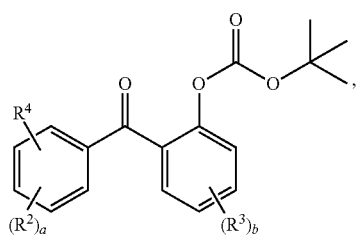

(II)

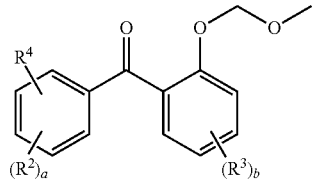

(III)

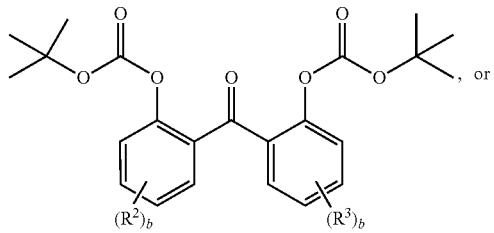

(IV)

, or

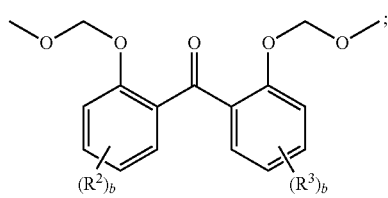

(V)

wherein "a" is an integer from 1 to 5 and "b" is an integer from 1 to 4;
$R^1$ is a protecting group;
$R^2$ and $R^3$ are independently at each occurrence hydrogen, halogen, a $C_1$-$C_{20}$ aliphatic radical, a $C_3$-$C_{20}$ cycloaliphatic radical, or a $C_2$-$C_{30}$ aromatic radical;
and $R^4$ is hydrogen or $OR^1$. Protecting group is as defined hereinabove.

In some embodiments, the reactant is dispersed in the thermoplastic polymer matrix. In some embodiments, the latent chromophore may be substantially uniformly dispersed in the polymer matrix. In some other embodiments, the reactant is bonded to the polymer matrix. In some embodiments, reactant may be covalently attached, or otherwise associated with, the polymer matrix. For example, in some embodiments, polymers functionalized with protected benzophenones may be utilized as the polymer matrix.

In some embodiments, as noted earlier, a latent chromophore may be chemically bonded to the polymer matrix. In such instances, the moiety having a formula (I) to (V) may further include functional groups capable of chemically bonding to the polymer matrix, in some embodiments. In some other embodiments, the moiety having a formulae (I) to (V) may further including functional groups (for example, a vinyl group) capable of undergoing a polymerization reaction to form the thermoplastic polymer matrix. In some embodiments, $R^2$ and $R^3$ in formulae (I) to (V) further include a functional group capable of bonding to the thermoplastic matrix or capable of undergoing a polymerization reaction to form the thermoplastic matrix.

The thermoplastic polymer matrix may include a linear, branched or cross-linked polymer or co-polymer. Any polymer may be used so long as the sensitizer and reactant may be substantially uniformly dispersed therein or alternatively the reactant may be easily bonded thereto. Further, any polymer utilized may desirably not substantially interfere with the upper triplet energy transfer process. The polymer matrix may desirably include a polymer that is optically transparent, or at least has a high transparency at the wavelength contemplated for recording and reading the optical data storage medium.

Particular examples of suitable polymers for use in the polymer matrix include, but are not limited to, poly(alkyl methacrylates), such as poly(methyl methacrylate) (PMMA), polyvinyl alcohols, poly(alkyl acrylates), polystyrenes, polycarbonates, polyacrylates, poly(vinylidene chloride), poly(vinyl acetate), and combinations thereof. As mentioned above, the reactant may also be covalently attached, or otherwise associated with, the polymer matrix. For example, polymers such as polyacrylates including benzophenone moiety are readily available, or, are readily functionalized to include benzophenone moieties.

As noted earlier, the refractive index change within the optical storage medium is affected by formation of chromophore from the latent-chromophore. This is in contrast to photopolymer-based optical data storage media, where the media is recorded onto by photo-initiated polymerization of a monomer. Accordingly, the dimensional changes accompanying recording of data may be lower than those associated with recording of data using photopolymers. Further, the thermoplastic polymer matrix-based optical data storage medium of the present invention advantageously provide for a stable, substantially-rigid media, which is in contrast to the gel-like photopolymer-based media.

In one embodiment, the method includes providing an optical data storage medium by procuring or obtaining the optical data storage medium having the desired components. In one embodiment, the method includes providing an optical data storage medium by preparing or making the optical data storage medium. In some embodiments, the optical data storage medium described herein may be prepared by blending the desired latent acid generator, sensitizer, reactant, and polymer matrix. In some other embodiments, where the reactant is bonded to the polymer matrix, the optical data storage medium described herein can be prepared by blending the desired latent acid generator, sensitizer, and polymer matrix including the bound reactant. Proportions of these may vary over a wide range, and the optimum proportions and methods of blending may be readily determined by those of ordinary skill in the art.

In one embodiment, the method may further include manufacturing an optical data storage medium. In some embodiments, the method of manufacturing includes the step of forming a film, an extrudate, or an injection molded part of a composition including a thermoplastic polymer matrix, a non-linear sensitizer, a latent acid generator, and a reactant. In one embodiment, the method includes solvent-casting, spin-coating, injection molding, or extruding a composition including a thermoplastic polymer matrix, a non-linear sensitizer, a latent acid generator, and a reactant.

In one embodiment, the latent acid generator is present in an amount in a range of from about 0.01 weight percent to about 15 weight percent of the optical data storage medium. In another embodiment, the latent acid generator is present in an amount in a range of from about 0.1 weight percent to about 10 weight percent of the optical data storage medium.

The amount of non-linear sensitizer used in the optical data storage media may depend on its optical density at the wavelength of light used to record the hologram. Solubility of the sensitizer may also be a factor. In one embodiment, the non-linear sensitizer is present in an amount of from about 0.001 weight percent to about 15 weight percent of the optical data storage media. In another embodiment, the sensitizer is present in an amount of from about 0.01 weight percent to about 10 weight percent of the optical data storage medium. In yet another embodiment, the sensitizer is present in an amount of from about 0.1 weight percent to about 10 weight percent of the optical data storage medium.

The reactant may be present in relatively high concentrations both to yield large changes in optical properties within the polymer matrix and to promote efficient chemical amplification. In one embodiment, the reactant is present in the optical data storage media in an amount in a range from about 5 weight percent to about 95 weight percent of the optical data storage medium. In another embodiment, the reactant is present in the optical data storage media in an amount in a range from about 10 weight percent to about 90 weight percent of the optical data storage medium. In yet another embodiment, the reactant is present in the optical data storage media in an amount in a range from about 20 weight percent to about 80 weight percent of the optical data storage medium.

In one embodiment, the optical data storage medium further includes a mediator capable of transferring triplet energy from the non-linear sensitizer to the latent acid generator. In one embodiment, the triplet state of the mediator is desirably (a) below the triplet state ($T_n$; n>1) of the sensitizer but above the $T_1$ of the sensitizer and (b) above the triplet state ($T_1$) of the latent acid generator, or between about 55 kilocalories per mole to about 90 kilocalories per mole. In one embodiment, if the mediator is dispersed within the polymer matrix the mediator may be present in an amount in a range from about 1 weight percent to about 20 weight percent in the polymer matrix.

Examples of suitable mediators include, but are not limited to, acetophenone ($T_{1m} \approx 78$ kcal/mol), dimethylphthalate ($T_{1m} \approx 73$ kcal/mol), propiophenone ($T_{1m} \approx 72.8$ kcal/mol), isobutyrophenone ($T_{1m} \approx 71.9$ kcal/mol), cyclopropylphenylketone ($T_{1m} \approx 71.7$ kcal/mol), deoxybenzoin ($T_{1m} \approx 71.7$ kcal/mol), carbazole ($T_{1m} \approx 69.76$ kcal/mol), diphenyleneoxide ($T_{1m} \approx 69.76$ kcal/mol), dibenzothiophene ($T_{1m} \approx 69.5$ kcal/mol), 2-dibenzoylbenzene ($T_{1m} \approx 68.57$ kcal/mol), benzophenone ($T_{1m} \approx 68$ kcal/mol), polyvinylbenzophenone ($T_{1m} \approx 68$ kcal/mol), 1,4-diacetylbenzene ($T_{1m} \approx 67.38$ kcal/mol), 9H-fluorene ($T_{1m} \approx 67$ kcal/mol), triacetylbenzene ($T_{1m} \approx 65.7$ kcal/mol), thioxanthone ($T_{1m} \approx 65.2$ kcal/mol), biphenyl ($T_{1m} \approx 65$ kcal/mol), phenanthrene ($T_{1m} \approx 62$ kcal/mol), phenanthrene ($T_{1m} \approx 61.9$ kcal/mol), flavone ($T_{1m} \approx 61.9$ kcal/mol), 1-napthonirile ($T_{1m} \approx 57.2$ kcal/mol), poly (naphthoylstyrene) ($T_{1m} \approx 55.7$ kcal/mol), fluorenone ($T_{1m} \approx 55$ kcal/mol), and combinations thereof.

In one embodiment, the optical data storage medium further includes a base, wherein the base is present in an amount in a range of from about 0.1 mole percent to about 10 mole percent of the latent acid generator in the optical data storage medium. Without being bound by any theory, it is believed that the base provides for quenching of the acid after the desired deprotection of latent chromophores, and enhances the lifetime of the medium.

The optical data storage media described herein may be in a self-supporting form. Alternatively, the data storage media may be coated onto a support material, such as polymethylmethacrylate (PMMA), polycarbonate, poly(ethylene terephthalate), poly(ethylene naphthalate), polystyrene, or cellulose acetate. Inorganic support materials such as glass, quartz or silicon may also be used in embodiments wherein use of a support material may be desired.

In such embodiments, the surface of the support material may be treated in order to improve the adhesion of the optical data storage media to the support. For example, the surface of the support material may be treated by corona discharge prior to applying the optical data storage media. Alternatively, an undercoating, such as a halogenated phenol or partially hydrolyzed vinyl chloride-vinyl acetate copolymer may be applied to the support material to increase the adhesion of the storage media thereto.

The method further includes irradiating a volume element of the optical data storage medium with an interference pattern, said interference pattern comprising an incident radiation having a wavelength and an intensity sufficient to cause upper triplet energy transfer from the non-linear sensitizer to the latent acid generator, thereby generating an acid.

In one embodiment, the method includes selecting wavelength and intensity value of the incident radiation such that the non-linear sensitizer has low absorption or a low extinction coefficient within that wavelength range if the intensity is lower than a threshold value and high absorption if the intensity is greater than a threshold value. In one embodiment, the method includes irradiating the medium with an incident radiation having a wavelength in a range from about 300 nanometers to about 532 nanometers. In one embodiment, the method includes irradiating the medium with an incident radiation having a wavelength in a range from about 300 nanometers to about 532 nanometers. In a particular embodiment, the method includes irradiating the medium with an incident radiation having a wavelength of about 405 nanometers.

In one embodiment, the method includes irradiating the optical data storage medium with incident radiation having an intensity greater than a threshold value. The term "threshold value" refers to the intensity of incident radiation above which the non-linear sensitizer has an absorption greater than the absorption if the intensity was lower that than the threshold value. In one embodiment, the method includes irradiating the optical data storage medium with incident radiation having an intensity at least 2 orders of magnitude greater than the ambient light. In a particular embodiment, the method includes irradiating the medium with an incident radiation having a wavelength of about 405 nanometers and an intensity greater than a threshold value. In a particular embodiment, the method includes irradiating the medium with an incident radiation having a wavelength of about 405 nanometers and an intensity in a range from about 50 MW/cm$^2$ to about 300 MW/cm$^2$.

As noted earlier, the method includes causing an upper triplet energy transfer from the non-linear sensitizer to the latent acid generator. The term "upper triplet energy transfer" as used herein refers to non-radiative transfer of energy between the upper triplet energy state ($T_n$) of the non-linear sensitizer and the $T_1$ state of the latent acid generator.

This step of upper triplet energy transfer is further illustrated in FIG. 3. FIG. 3 is a schematic energy level diagram showing the upper triplet $T_n$ excited state absorption and resulting energy transfer for a sensitizer exhibiting reverse saturable absorption. As shown in energy level diagram 300, arrow 301 illustrates the ground state absorption cross section of a photon as it transitions from the singlet ground state $S_0$ to a first excited state $S_1$. The intersystem-crossing rate, represented by arrow 302, signifies the transfer of energy that occurs when the sensitizer moves from an excited singlet state $S_1$ to a corresponding triplet state $T_1$. Arrow 303 indicates the excited triplet state absorption cross section. Once the upper level triplet state $T_n$ is achieved by subsequent linear absorption, two upper excited decay processes are possible. One possible decay process, denoted by arrow 304 in FIG. 3, is the non-radiative relaxation by internal conversion (IC) to the lower lying $T_1$ state. The other possible decay process is denoted by arrow 305 in FIG. 3, and involves the release of energy from the sensitizer and the transfer of this energy to the latent-acid generator via triplet-triplet energy transfer. The method further includes generation of an acid or proton from the latent acid generator as indicated by 306.

The method further includes reacting at least one latent chromophore with the acid generated to form at least one chromophore. As noted earlier, the acid or proton generated from the latent acid generator catalyzes acid-based deprotection of the chromophore having acid labile protecting groups, thereby forming a chromophore. The generation of a chromophore from the latent chromophore leads to localized modulation of concentrations of the chromophore and the latent chromophore and this change in absorbance of the material creates a change in the refractive index within the volume element. This generation of chromophore within the irradiated volume element produces refractive index variations corresponding to the interference pattern, thereby producing an optically readable datum or a hologram. As indicated in FIG. 3, the reactant undergoes a change denoted by 310 to form the holographic grating and record the data there. In one embodiment, the method includes recording a hologram. In another embodiment, the method includes recording a microhologram.

In one embodiment, the method includes reacting a plurality of latent chromophores with each acid generated to form a plurality of chromophores. In one embodiment, the method includes reacting a plurality of protected benzophenones with each acid generated to form a plurality of hydroxy-benzophenones. Without being bound by any theory, it is believed that either the latent chromophore does not consume the acid or the latent chromophore regenerates the acid in order to provide acid for deprotection of neighboring molecules, and thus produces multiple deprotections for each acid generated.

As noted earlier, an acid or proton is generated from the latent acid generator on upper triplet energy transfer from the non-linear sensitizer to the latent acid generator. In some embodiments, for each proton generated multiple deprotections of the latent chromophore are possible resulting in generation of multiple chromophores. Accordingly, in some embodiments the method includes a chain reaction, wherein many new molecules (chromophores) are formed per photon absorbed resulting in chemical amplification. Thus, a relatively large change in refractive index or a high sensitivity may be obtained at low exposure to recording beam. Further, the method advantageously allows quantum efficiency (QE) of 1 or more while utilizing lesser photons or power density.

In one embodiment, the method advantageously allows for sensitivity values greater than about $5 \times 10^{-4}$ cm$^2$/Joule. In another embodiment, the method advantageously allows for sensitivity values greater than about $1 \times 10^{-3}$ cm$^2$/Joule. In yet another embodiment, the method advantageously allows for sensitivity values greater than about $2 \times 10^{-3}$ cm$^2$/Joule.

As noted earlier, the method of the present invention advantageously allows for bit-wise recording of microholographic holographic data in an optical data storage medium. The non-linear sensitizers used in the present optical data storage media are capable of transferring energy from an upper triplet state ($T_n$, wherein n>1), which has a very short lifetime (nanoseconds to a few µ (micro) seconds) to the latent acid generator. The ability to transfer energy from the $T_n$ state provides the optical storage media provided herein with its non-linear or threshold properties. That is, $T_n$ excited state absorption is only appreciable when the sensitizer is excited by high-intensity light, and negligibly small when excited by low-energy radiation. This allows for the present optical data storage media, including the non-linear sensitizers, to remain substantially transparent and inert to low intensity radiation, e.g., reading or ambient light, and to only change its properties (absorbance and thus, refractive index) in response to high energy recording light, e.g., light having an intensity at least 2 orders of magnitude or more greater than readout light. As a result, the present optical data storage media exhibits the non-linear threshold behavior desired for the bit-wise recordation of microholographic data.

Figure 2:
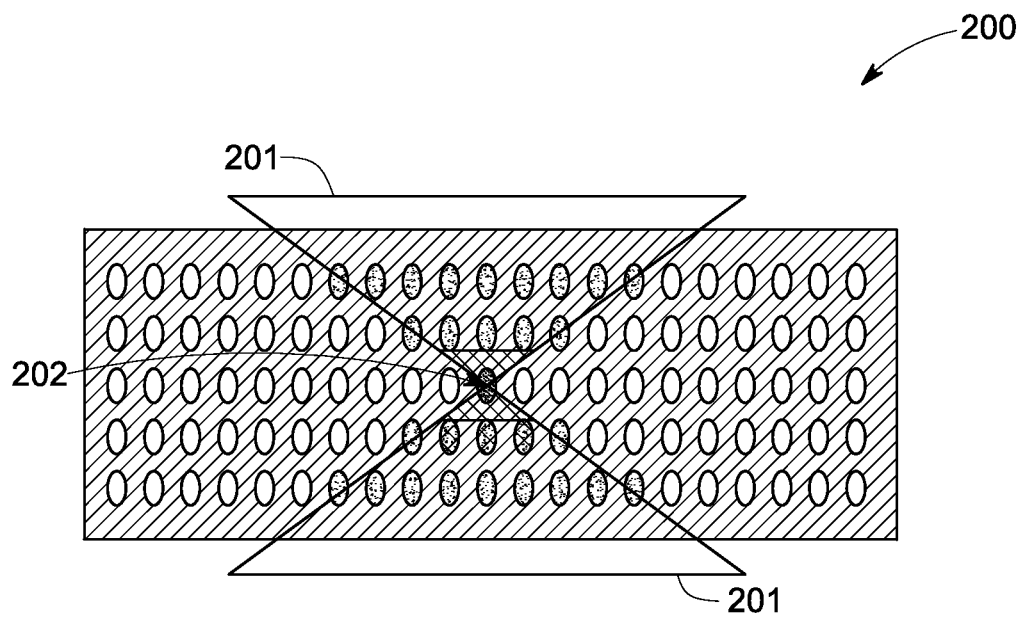
FIG. 2 is a cross-sectional view of an optical storage media, showing the area of impact of actinic radiation if the media comprises a linear sensitizer and the area of impact of actinic radiation if the media comprises a non-linear sensitizer.

Further, the method advantageously allows for recording of microholographic data in multiple layers without affecting the data in the other layers during the writing and/or reading step. This is in contrast to media include linear photosensitive materials. As shown in FIG. 2, in optical data storage media 200 comprising linear photosensitive materials, consumption of dynamic range may occur in non-addressed volumes, substantially everywhere incident radiation passes through, shown as sections 201. In contrast, if optical data storage media 200 includes non-linear sensitizers, consumption of dynamic range in non-addressed volumes is reduced or eliminated and consumption may occur substantially only in the target volume, i.e., at the focal point 202 of the incident radiation. The use of non-linear sensitizers in the present optical data storage medium thus facilitates recording into a layer of bit-wise data buried in the bulk of the medium without disruption of adjacent layers of previously recorded data or vacant space available for subsequent recording.

Furthermore, as the light intensity in a tightly focused laser beam varies dramatically through the depth of the focal spot and is usually at its maximum at the beam waist (narrowest cross section), the threshold response of the medium will naturally restrict material conversion to occur only in the immediate vicinity of the beam waist. This may lead to a reduction in microhologram size within each layer, thus facilitating an increase in layer data storage capacity of the present media, so that the overall data storage capacity of the media may also be increased. The optical data storage media prepared by methods in accordance with some embodiments of the invention may also advantageously be substantially stable in ambient light, so that exposure to the same does not result in substantial deterioration or damage to the media.

In some embodiments, methods of the present invention advantageously provides an optical data storage media that exhibits refractive index changes (Δn) suitable for the recordation of microholograms at high data densities, e.g., refractive index changes of at least about 0.005, or at least about 0.05. Because of the refractive index change/diffraction efficiencies achievable by the present optical data storage media, the media may be capable of storing about 1 TB of information on a disk comparable in size to a single CD or single DVD.

In one embodiment, a method for recording holographic data in an optical data storage medium is provided. The method includes (i) providing an optical data storage medium comprising: (a) a thermoplastic polymer matrix, (b) a latent acid generator, (c) a non-linear sensitizer, and (d) a reactant including a protected benzophenone. The method includes (ii) irradiating a volume element of the optical data storage medium with an interference pattern, said interference pattern including an incident radiation having a wavelength and an intensity sufficient to cause upper triplet energy transfer from the non-linear sensitizer to the latent acid generator, thereby generating an acid, wherein the latent acid generator is substantially non-responsive to said incident radiation. The method further includes (iii) reacting a plurality of protected benzophenones with the acid generated to form a plurality of hydroxy benzophenones, thereby causing a refractive index change within the volume element, and (iv) producing within the irradiated volume element refractive index variations corresponding to the interference pattern, thereby producing an optically readable datum.

In one embodiment, an optical data storage medium is provided. The optical data storage medium includes (a) a thermoplastic polymer matrix; (b) a non-linear sensitizer capable of absorbing incident radiation having a wavelength and an intensity sufficient to cause upper triplet excitation; (b) a latent acid generator capable of generating an acid upon triplet excitation from the non-linear sensitizer and being substantially non-responsive to said incident radiation; (d) a reactant including a latent chromophore, wherein at least one latent chromophore is capable of forming at least one chromophore by reacting with the acid generated, thereby causing a refractive index change in the optical data storage medium. In some embodiments, a plurality of latent chromophores are capable of forming a plurality of chromophores for each acid generated.

EXAMPLES

Example 1

Synthesis of Non-Linear Sensitizer (PE1, PPE and PE2)

PE1 and PE2 refers to platinum ethynyl complexes bis(tributylphosphine)bis(4-ethynyl-benzene)platinum and bis(tributylphosphine)bis(4-ethynyl-1-(2-phenylethynyl)benzene)platinum, respectively. The naming protocol for these platinum ethynyl complexes is based on the phenyl ethynyl group, for example, PE1 is named for a complex having a pair of phenylethynyl group, PE2 for a pair of two phenylethynyl groups, and PPE for a pair of phenylphenylethynyl (PPE) groups.

Figure 4:
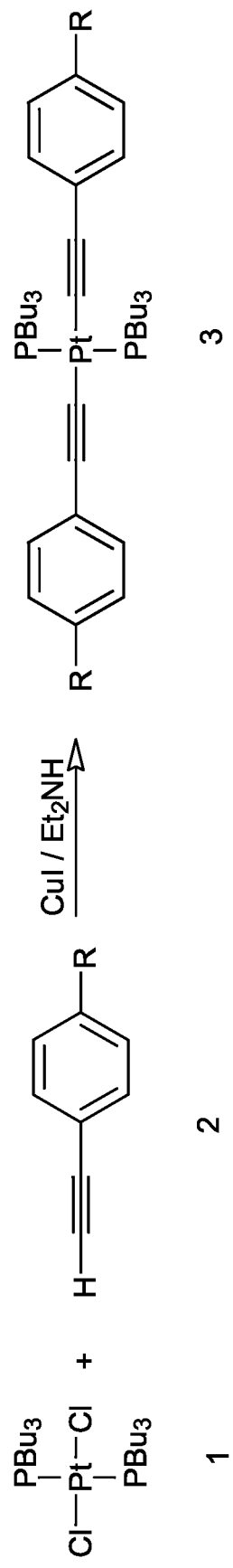
FIG. 4 is a schematic of synthesis scheme for synthesis of PE1 sensitizers, in accordance with one embodiment of the invention.

The synthesis of the PE1 Pt-ethynyl complexes, 3, proceeded through the copper catalyzed coupling of $PtCl_2(PBu_3)_2$ with terminal phenyl acetylenes, 2, as shown in FIG. 4 and as described in J. Phys. Chem. A 2002, 106, 10108-10115. The R groups may be varied as shown in Table 1 to provide a range of materials for evaluation. For the PPE derivative, the biphenyl derivative of the phenyl acetylene was used.

Synthesis and optical characterization of PE2-based non-linear sensitizers have been described in detail in co-pending U.S. patent application Ser. No. 12/551,410, incorporated herein by reference in its entirety for any and all purposes, so long as not directly contradictory with the teachings herein.

Example 2

Linear Optical Measurements

As mentioned above, minimal absorption at 405 nanometers is required for blue RSA dyes. UV-Vis spectra were taken of the platinum-ethynyl complexes prepared according to Example 1, and the absorptions were normalized by converting them to extinction coefficient as a function of the wavelength. The data from this example are summarized in Table 1.

TABLE 1 spectral characteristics of PPE and PE1 derivatives

| Sample | Acronyms | Structure | $\lambda_{max}$ | $\epsilon_{\lambda max}$ | $\epsilon_{405}$ |
|---|---|---|---|---|---|
| 1a | DiMEO-PE1 | MeO—C₆H₄—C≡C—Pt(PBu₃)₂—C≡C—C₆H₄—OMe | 337 | 31800 | 15 |
| 1b | 3,5-DiMeO-PE1 | (MeO)₂C₆H₃—C≡C—Pt(PBu₃)₂—C≡C—C₆H₃(OMe)₂ | 326 | 29600 | 9 |
| 1c | NMe₂-PE1 | Me₂N—C₆H₄—C≡C—Pt(PBu₃)₂—C≡C—C₆H₄—NMe₂ | 352 | 45500 | 80 |
| 1d | diF-PE1 | F—C₆H₄—C≡C—Pt(PBu₃)₂—C≡C—C₆H₄—F | 330 | 28200 | 12 |
| 1e | diMe-PE1 | Me—C₆H₄—C≡C—Pt(PBu₃)₂—C≡C—C₆H₄—Me | 335 | 31400 | 24 |
| 1f | PPE | Ph—C₆H₄—C≡C—Pt(PBu₃)₂—C≡C—C₆H₄—Ph | 331 | 75939 | 111 |

As shown in Table 1, PE1 and PPE complexes 1a-1f essentially have very low absorption at 405 nanometers. As noted earlier a desirable characteristic of the non-linear sensitizer based optical data storage medium is the low ground state absorption and very high excited state absorption (RSA property). Further, an amount of at least 0.04 M of the non-linear sensitizer may be desirable in the medium to maintain donor-acceptor within concomitant distance for efficient energy transfer. In order to meet the above conditions a desirable extinction coefficient at 405 nanometers may be less than about 200 cm$^{-1}$M$^{-1}$. Accordingly, the materials listed in Table 1 are suitable as non-linear sensitizers.

Example 3

Preparation of Protected Benzophenone and Acrylate Polymers

Figure 5:
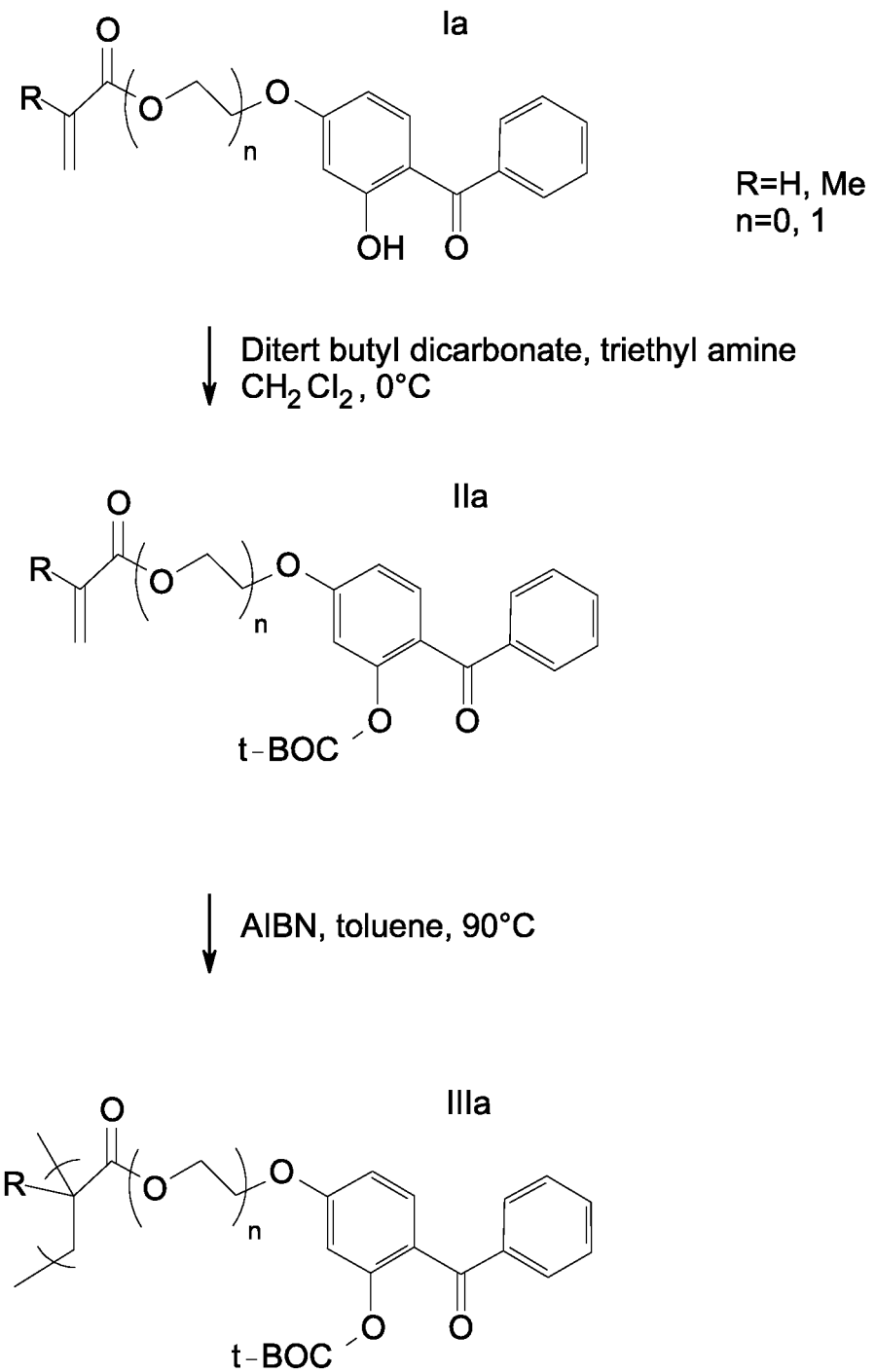
FIG. 5 is a schematic of synthesis scheme for synthesis of tBOC-polymer, in accordance with one embodiment of the invention.

Preparation of MOM protected benzophenone acrylate monomers IIa (FIG. 5): To a 500 mL round bottom flask was added acrylate monomer Ia (24.8 g, 0.088 mole), diisoproyl ethylamine (22.7 g, 0.17 moles), and 100 mL of methylene chloride. This mixture was stirred under nitrogen cooled by an ice bath to ~0 C, chloromethyl methyl ether was then added drop wise over 3 hours while maintaining temperature at 0 C. This solution was allowed to warm to room temperature and stirred overnight. The resulting solution was washed with water (3×200 mL), dried over MgSO4 and concentrated to provide a light yellow oil. This oil was purified by chromatography on silica gel eluting with hexanes—ethyl acetate (95:5-80:20), after concentrating a colorless solid IIa (>90% purified yield) was obtained.

Preparation of poly (MOM protected benzophenone acrylate) or MOM polymer IIIa (FIG. 5):—To a 25 ml round bottom flask was added 4.8 grams of the acrylate monomer IIa, 5.0 mg of AIBN, and 10 mL of toluene. This mixture was degassed with nitrogen for 10 minutes the mixture heated to 9° C. for 18 hours followed by cooling and precipitation into methanol. The white precipitate was collected by filtration and dried at 50 C under vacuum for 24 hrs (M$_w$ 90 k-125 k).

Figure 6:
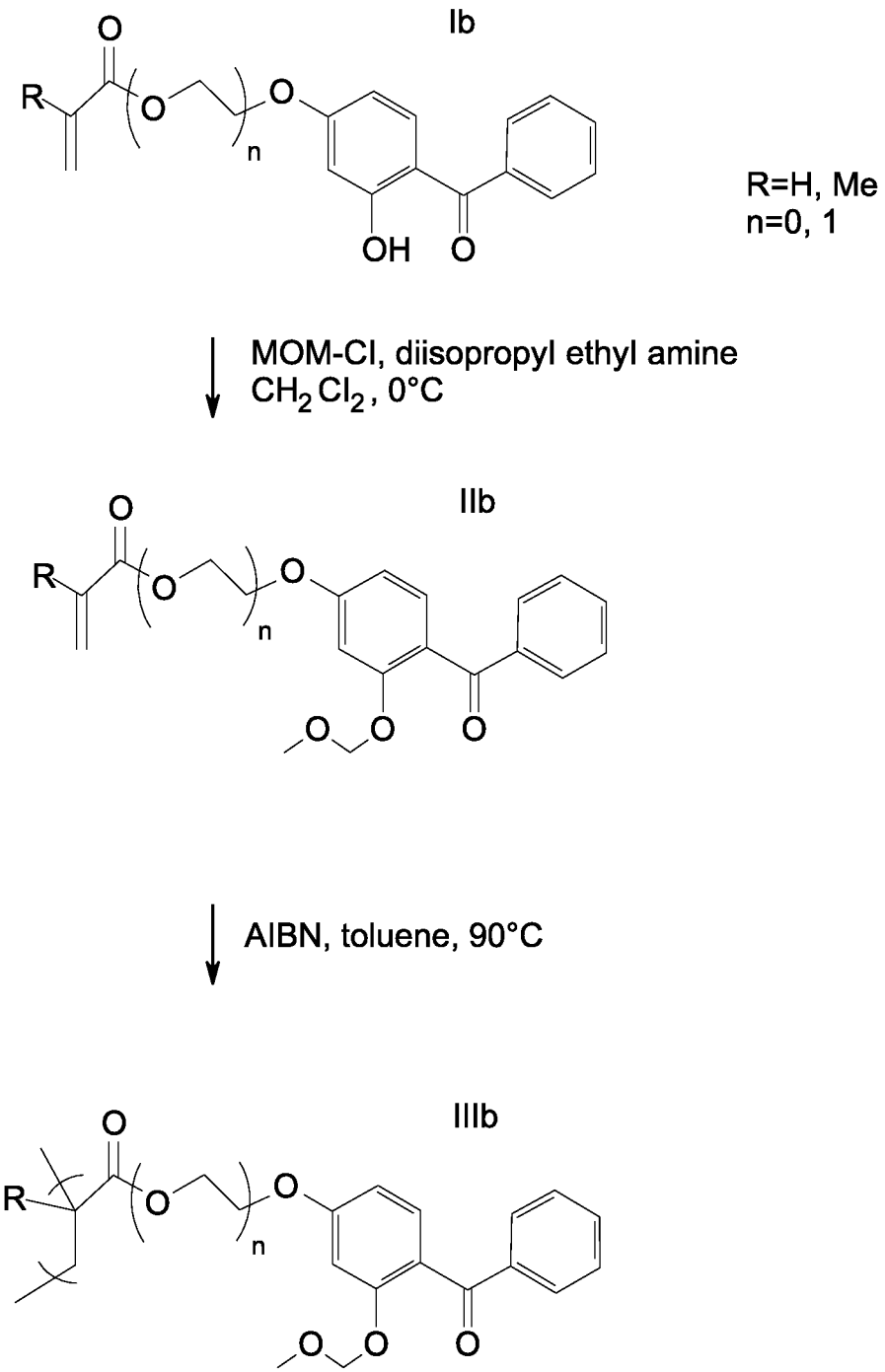
FIG. 6 is a schematic of synthesis scheme for synthesis of MOM-polymer, in accordance with one embodiment of the invention.

Preparation of t-BOC protected benzophenone acrylate monomers IIb (FIG. 6)—To a 500 mL round bottom flask was added acrylate monomer Ib (24.8 g, 0.088 mole), di-tert-butyl di carbonate (20.1 g, 0.092 mole), triethylamine (9.2 g, 0.092 mole), and 100 mL of methylene chloride. This mixture was stirred under nitrogen and cooled by an ice bath to ~0 C for three hours. The solution was allowed to warm to room temperature and stirred overnight. The resulting solution was washed with water (3×200 mL), dried over MgSO₄ and concentrated to provide a light yellow oil. This oil was purified by chromatography on silica gel eluting with hexanes—ethyl acetate (95:5-80:20), after concentrating a colorless solid IIb (>90% purified yield) was obtained Preparation of poly(t-BOC protected benzophenone acrylate) IIIb (FIG. 6)—To a 25 ml round bottom flask was added 4.8 grams of the acrylate monomer IIb and 5.0 mg of AIBN, and 10 mL of toluene. This mixture was degassed with nitrogen for 10 minutes the mixture heated to 90 C for 18 hours followed by cooling and precipitation into methanol. The white precipitate was collected by filtration and dried at 50 C under vacuum for 24 hrs (Mw 90-125 k).

Example 4

Refractive Index Change after Deprotection of Protected Benzophenone

Both the t-BOC-substituted and the MOM-substituted benzophenones absorbance data show a red shift for deprotected hydroxy benzophenone—from $\lambda_{max}$ of 280 nanometers in the protected form to formation of two new bands around 290 and 330 nanometers The corresponding refractive index change for the t-BOC protected and MOM protected benzophenones is 0.098 and 0.125, respectively.

Example 5

Deprotection of Protected Benzophenone in the Presence of a Polymer

To compare the effectiveness of deprotection chemistry between the tBOC polymer (refers to a PMMA polymer functionalized with tBOC-protected benzophenone moieties) and MOM polymer (refers to a PMMA polymer functionalized with MOM-protected benzophenone moieties) systems in thin films, trifluoroethane sulfonic acid (TFESA) was used as an acid. For thin film preparation, 2.2 weight percent solution of tBOC or MOM polymer was mixed with 0.1 equivalents of TFESA in tetrachloroethane until the contents dissolved. The solution was filtered through a 0.45 micrometer Whatman filter. The filtered solution was poured onto a 50 millimeters×25 millimeters microscopic slide and the solution was spin casted on a spin coater at about 2000 revolutions per minute for 30 seconds and then air dried for 4-6 hrs.

The deprotection of tBOC-protected benzophenones doped in PMMA was negligible at room temperature after 15 mins (<2%) and took 15 mins for complete deprotection at 100° C. temperature. However, the MOM-protected benzophenones doped in PMMA showed up to 25% deprotection even at room temperature within the first 15 mins.

Thus, deprotection using TFESA showed that the MOM-polymer may show faster kinetics for the quantum efficiency study when compared to the tBOC polymer. Therefore, all the non-linear sensitization studies were conducted on the MOM polymer. However, the tBOC polymer may also be used to write holograms, taking into account the slower kinetics and higher temperatures required.

Comparative Example 1

Deprotection Studies in Films Containing Linear Sensitizer, Latent Acid Generator, Reactant, and Polymer Control experiments were conducted on thin films of t-BOC polymer, 10 wt % latent acid generator (NapdiPhS-T, triplet energy 54 kcal/mol), and 5 wt % of linear triplet sensitizer (thioxanthene-9-one, triplet energy 65 kcal/mol) to test for benzophenone deprotection. A 5 mm spot of the sample when excited using 405 nanometers laser light showed benzophenone deprotection only after the sample was exposed for 40 mins followed by heating the sample to 80-100° C.

Control experiments were conducted on thin films of t-BOC polymer, 10 wt % latent acid generator (TPS-T), and in the absence of thioxanthene-9-one. A 5 mm spot of the sample when excited using 405 nanometers laser light showed no benzophenone deprotection as the latent acid generator does not absorb in that wavelength.

Control experiments were conducted on thin films of t-BOC polymer, and 5 wt % thioxanthene-9-one. A 5 mm spot of the sample when excited and irradiated with UV lamp for 45 mins with 360 nanometers long pass filter (to make sure only thioxanthene-9-only gets excited) showed no deprotection. Thus, acid generation is important for benzophenone deprotection.

Examples 6

Sensitivity Measurements for Thin Films Containing Latent Acid Generator, Non-Linear Sensitizer, Reactant, and Polymer The latent acid generators TPS-butane-ST (Tris(4-tert-butylphenyl)sulfonium perfluoro-1-butanesulfonate), TPS-T (Triphenyl sulfonium triflate), IPhdiPhS-T (para-Iodophenyl diphenyl sulfonium triflate) and NapdiPhS-T (Naphthyl diphenyl sulfonium triflate) were obtained commercially from Sigma Aldrich and BTBPI-TMM Bis(4-tert-butylphenyl)iodonium tris(perfluoromethanesulfonyl)methide) was obtained from Daychem Laboratories Inc. The non-linear sensitizers listed in Table 1 were used as reverse saturable absorbers (RSA) and were prepared as described hereinabove.

Thin film samples for demonstrating microholograms and recording the reflectivity after writing microholograms were prepared as follows. A 2.2 weight percent solution of tBOC or MOM polymer in tetrachloroethane was mixed with 0.04 moles of RSA (PE1, PE2 or PPE dye) and 10 wt % of the latent acid generator using a stir plate until the contents dissolved. In some cases, contents were dissolved by heating the solution on a hot plate at about 70 degrees Celsius. The resulting solution was filtered through a 0.45 micrometer Whatman filter. The filtered solution was poured onto a 50 millimeters×25 millimeters microscopic slide and the solution was spin casted on a spin coater at about 2000 revolutions per minute for 30 seconds. This was followed by drying the slide for about 20 minutes to about 30 minutes in an oven at a temperature of about 70 degrees Celsius. The thickness of the polymer film formed was approximately about 100 nanometers. The details of the RSA dye (non-linear sensitizer) and the latent acid generator used, and the amount of RSA dye is provided in Table 2 below. A comparative sample (Comparative sample 6a) was prepared using polyvinylcinnamate (PVCm) as the reactant.

To define the quantum efficiency (QE) and sensitivity of energy transfer (ET) process the optical setup described below was used. The setup consisted of two light sources: one from the UV-Vis lamp and other from the optical parametric oscillator (OPO). Due to material characteristics the index change material had maximum absorbance at 280 nanometers. The UV probe chosen had a wavelength in a range of about 280 nanometers to about 320 nanometers. 405 nanometers wavelength was used from the output of OPO system as pump exposure source as the RSA dye is supposed to have a small portion of absorption in the 405 nanometers wavelength. The quantum efficiency measurements that provided the sensitivity values at write intensities of 264 MW/cm$^2$ are provided in Table 2.

Table 2 shows the sensitivity of samples prepared in Example 6 at write intensity of 264 MW/cm$^2$

| Sample No. | Reactant | Non-Linear Sensitizer | Wt % Non-Linear Sensitizer | Latent acid generator (10 wt %) | Sensitivity cm$^2$/J |
|---|---|---|---|---|---|
| Sample 6a | MOM-Polymer[a] | PE2 | 4.0 | TPS-butaneST | $6 \times 10^{-3}$ |
| Sample 6b | MOM-Polymer | PE2 | 4.0 | BTBPI-TMM | $4.4 \times 10^{-3}$ |
| Sample 6c | MOM-Polymer | PE2 | 4.0 | TPS-T | $5.5 \times 10^{-3}$ |
| Sample 6d | MOM-Polymer | PE2 | 0.04 | TPS-butaneST | $6 \times 10^{-3}$ |
| Sample 6e | MOM-Polymer | PE2 | 2.0 | TPS-T | $4.3 \times 10^{-3}$ |
| Sample 6f | MOM-Polymer | CH$_3$—PE2 | 4.1 | TPS-butaneST | $0.9 \times 10^{-3}$ |
| Sample 6g | MOM-Polymer | 3,5-diMeOPE2 | 4.2 | TPS-butaneST | $2.8 \times 10^{-3}$ |
| Sample 6h | MOM-Polymer | 3,5-diMeOPE1 | 3.3 | TPS-butaneST | $2.3 \times 10^{-3}$ |
| Sample 6i | MOM-Polymer | Me$_2$N PE1 | 4.0 | TPS-butaneST | $5.3 \times 10^{-3}$ |
| Sample 6j | MOM-Polymer | PPE | 3.8 | TPS-butaneST | $5.3 \times 10^{-3}$ |
| Sample 6k | di-MOM (30%) + polymer[b] | PE2 | 4.0 | TPS-butaneST | $4.8 \times 10^{-3}$ |
| Comparative Sample 6a | PVCm | PE2 | 4 | None | $5.45 \times 10^{-6}$ |

[a]MOM-Polymer refers to a PMMA polymer functionalized with MOM-protected benzophenone moieties.
[b]MOM + Polymer refers to a PMMA polymer blended with MOM-protected benzophenone materials.

The sensitivity values reported in Table 2 were obtained by triplet energy transfer from the higher triplet states ($T_{n>1}$) of the RSA to the latent acid generator, which in turn generates the acid and the generated acid deprotects the methoxy methyl group in the MOM protected benzophenone, which gives rise to the refractive index change, thus creating a pattern. Thus, the sensitivity value is the efficiency of all the following combined processes: 1) absorption/excitation; 2) intersystem crossing to triplet state; 3) a second absorption to higher lying triplet ($T_{n>1}$); 4) energy transfer to latent acid generator; 5) generation of proton; and 6) catalytic deprotection of protected benzophenones.

Table 2 shows the results of sensitivities obtained for the MOM polymer with various RSA dyes and latent acid generators. As noted in Table 2, sensitivity values of the order of $10^{-3}$ cm$^2$/J sensitivity were obtained for Samples 6a-6k. In comparison, a polyvinylcinnamate (PVCm) system that does not include the latent acid generator showed sensitivity values that were three orders of magnitude lower (Comparative Sample 6a). This may be attributed to the catalytic acid deprotection of the MOM-polymer. Thus, for every acid molecule that helps in deprotecting the MOM group a new acid (H$^+$) is created as by-product, which deprotects the next MOM-benzophenone polymer. This sequence of event results in high turnover numbers and the deprotection continues until the H$^+$ molecule is consumed by something else in the polymer matrix (for example a base).

Table 2 further shows the comparison between the doped polymers (Sample 6k) versus appended polymers (Sample 6a). As noted in Table 2, the sensitivity values are comparable for the doped versus appended polymers. In some embodiments, appended polymers may be desirable to avoid diffusion or evaporation of the protected or deprotected benzophenone molecules from the matrix.

Example 7

Microhologram Recording

Samples for microhologram recording were prepared using 10 wt % of solids (Sample 6e of Table 2) in dichloroethene (DCE). The solution was deposited into metal rings on treated glass to make a film. The resulting film was dried, removed from glass/rings, and then pressed between glass slides at about 100° C. The film thickness was 100-200 micrometers.

A tunable optical parametric oscillator system operating at the 405 nm wavelength was used as a pulsed light source for recording and readout of micro-holograms. The light was focused into the medium sample using optics with numerical aperture (NA) of 0.4, resulting in the approximate dimensions of the recording volume to be ~0.65×0.65×2.6 μm. The pulse energies used for micro-hologram recording was between 1-10 nano-Joules, which allowed one to achieve light intensity values of tens to hundreds of MW/cm$^2$ at the focal spot of such focused recording beam. The readout of the light reflected from micro-holograms was done using the same beam attenuated by approximately 100-1000× with respect to the recording power.

The recording of micro-holograms in the optical data storage media was performed by two high-intensity counter-propagating pulsed recording beams focused and overlapped in the bulk of the recording medium to produce the intensity fringe pattern consisting of light and dark regions (fringes). The illuminated regions of the interference pattern undergo a change as described above, which results in a locally modified refractive index of the material, while the dark regions remain intact, thus creating a volume hologram. The present optical data storage media is sensitive to a high-intensity light and is relatively inert to the low-intensity radiation. The power of the recording beam was adjusted so that the light intensity near the focal region of the beam is above the recording threshold (above which the change readily occurs), while remaining low outside the recordable region away from the focal spot of the beam, thus eliminating unintended media modification (recording or erasure).

During micro-hologram recording, the primary recording beam was split into the signal and the reference using a half-wave plate (λ/2) and a first polarization beam splitter. The two secondary beams were steered to the sample in a counter-propagating geometry and are focused to overlap in the bulk of the optical data storage media by identical aspheric lenses with a numerical aperture (NA) of up to 0.4. The polarization of both beams was converted into circular polarization—with two quarter-wave plates (λ/4) to ensure that the beams interfere to create a high-contrast fringe pattern. The sample and the signal beam lens were mounted on closed-loop three-axis positioning stages with 25 nm resolution. A position-sensitive detector on the reference side of the sample was used to align the signal lens for optimized overlap of the focused signal and reference beams in the medium, and thus, optimized recording.

A variable attenuator and the half-wave plate/PBS assembly were used to control the power level during recording and/or read-out. This allows the micro-holographic recording characteristics of the optical data storage media to be measured as a function of the recording power and/or energy. This functional dependence distinguishes between a linear optical data storage medium/recording, where the strength of the recorded hologram is largely defined by the total amount of light energy received by the medium, but is independent of the light intensity, and a nonlinear, threshold optical data storage medium/recording, where the recording efficiency is highly dependent upon the intensity of the light. In a linear medium, a small exposure results in a low-strength hologram, which gradually grows with higher exposures. In contrast, in a nonlinear, threshold medium, recording is only possible with intensity exceeding the threshold value.

During read-out, the signal beam was blocked, and the reference beam was reflected by the micro-holograms in the direction opposite to the incident direction. The reflected beam was coupled out from the incident beam path using the quarter-wave plate and a second polarizing beam splitter, and was collected on a calibrated photodetector in a confocal geometry to provide an absolute measure of the diffraction efficiency. By translating the sample with respect to the read-out optics, it was possible to obtain a 3D profile of a micro-hologram diffraction response and evaluate dimensions of a micro-hologram.

Figure 7:
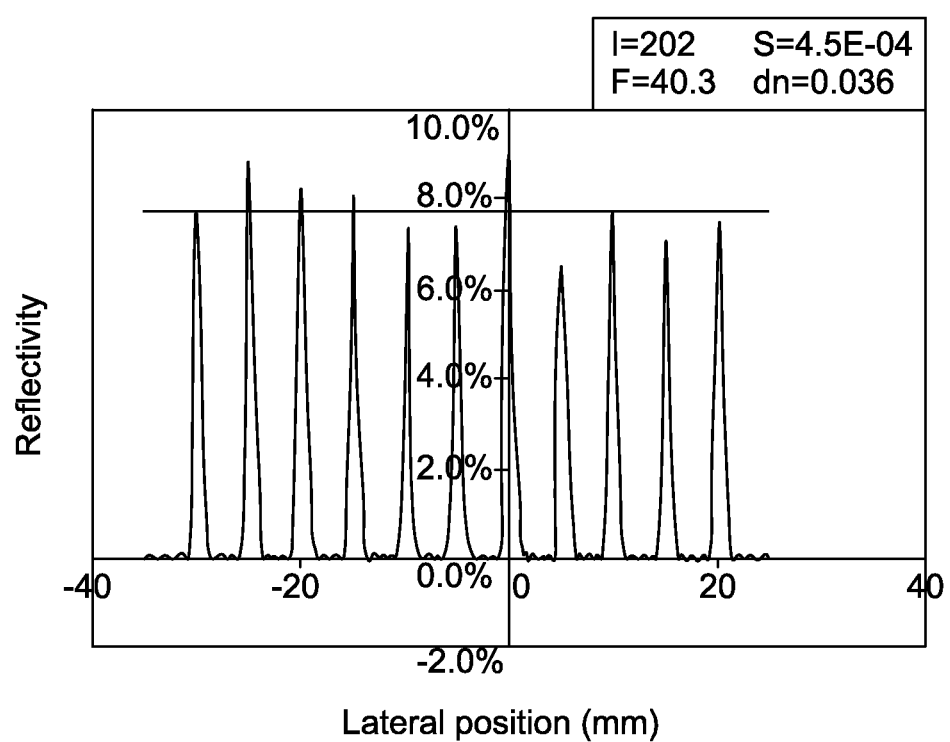
FIG. 7 is a readout scan of a representative array of holograms recorded in a sample, in accordance with one embodiment of the invention.

A representative reflectivity versus beam position scan from an array of micro-holograms recorded in sample corresponding to Sample 6e in Table 2 is shown in FIG. 7. All 11 holograms were recorded with an intensity of 200 MW/cm² (at the illuminated fringe location) with a fluence of 40 J/cm² in both recording beams. The optical density of the film at 405 nm was measured to be 0.28. Using plane-wave coupling formalism, modulation of the refractive index generated in the hologram through recording process was estimated at ~0.036, and achieved sensitivity of the recording process (at 200 MW/cm²) was $4.5 \times 10^{-4}$ cm²/J. It should be noted that the sensitivity value obtained from micro-hologram recording conditions is an indirect measurement, and is subject to various uncertainties in the recording condition, for example, grating shape, exact grating depth, and therefore may be considered an estimate that may have systematic differences from a more direct QE measurement described in Example 6 above (Table 2).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for recording holographic data in an optical data storage medium, said method comprising:
   (i) providing an optical data storage medium comprising: (a) a thermoplastic polymer matrix, (b) a latent acid generator, (c) a sequential two-photon non-linear sensitizer, and (d) a reactant comprising a latent chromophore;
   (ii) irradiating a volume element of the optical data storage medium with an interference pattern to cause sequential two-photon absorption by the non-linear sensitizer;
   (iii) an upper triplet energy transfer from the non-linear sensitizer to the latent acid generator, thereby generating an acid,
       said interference pattern comprising an incident radiation having a wavelength and an intensity sufficient to cause the upper triplet energy transfer, wherein the latent acid generator is substantially non-responsive to said incident radiation;
   (iv) reacting at least one latent chromophore with the acid generated to form at least one chromophore, thereby causing a refractive index change within the volume element; and
   (v) producing within the irradiated volume element refractive index variations corresponding to the interference pattern, thereby producing an optically readable datum.

2. The method of claim 1, wherein step (iv) comprises reacting a plurality of latent chromophores with each acid generated to form a plurality of chromophores.

3. The method of claim 1, wherein the incident radiation has a wavelength in a range from about 360 nanometers to about 500 nanometers and an intensity greater than a threshold value.

4. The method of claim 1, wherein the incident radiation has a wavelength of about 405 nanometers.

5. The method of claim 1, wherein the latent chromophore comprises a moiety having a structural formula (I):

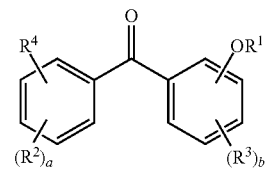

wherein "a" is an integer from 1 to 5 and "b" is an integer from 1 to 4;

$R^1$ is a protecting group;

$R^2$ and $R^3$ are independently at each occurrence hydrogen, halogen, a $C_1$-$C_{20}$ aliphatic radical, a $C_3$-$C_{20}$ cycloaliphatic radical, or a $C_2$-$C_{30}$ aromatic radical;

and $R^4$ is hydrogen or $OR^1$.

6. The method of claim 1, wherein the latent chromophore comprises a moiety having a structural formula:

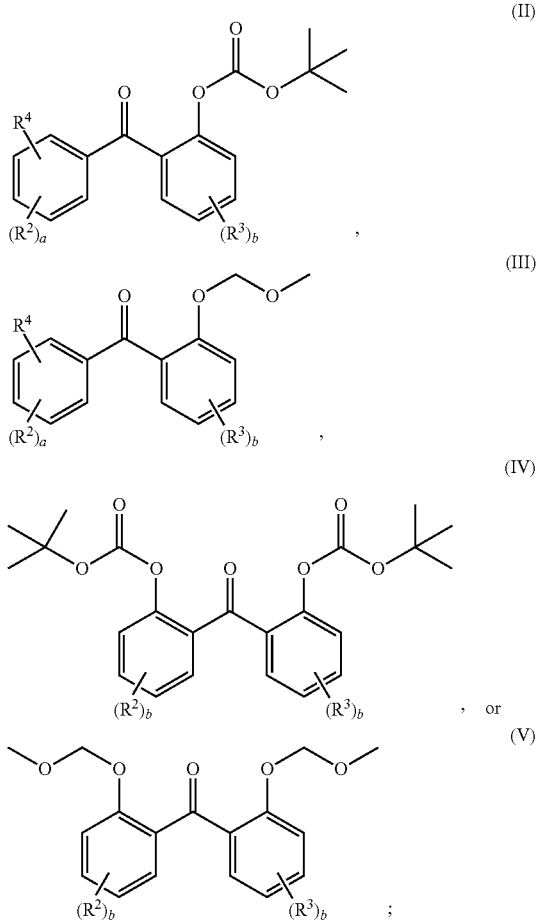

wherein "a" is an integer from 1 to 5 and "b" is an integer from 1 to 4;
$R^1$ is a protecting group;
$R^2$ and $R^3$ are independently at each occurrence hydrogen, halogen, a $C_1$-$C_{20}$ aliphatic radical, a $C_3$-$C_{20}$ cycloaliphatic radical, or a $C_2$-$C_{30}$ aromatic radical;
and $R^4$ is hydrogen or $OR^1$.

7. The method of claim 1, wherein the chromophore comprises a hydroxy benzophenone.

8. The method of claim 1, wherein the latent acid generator is selected from the group consisting of sulfonium salts, iodonium salts, sulfonates, and triflates.

9. The method of claim 1, wherein the non-linear sensitizer comprises a non-linear absorber capable of absorbing incident radiation at a wavelength in a range from about 360 nanometers to about 500 nanometers.

10. The method of claim 1, wherein the non-linear sensitizer comprises a platinum ethynyl complex.

11. The method of claim 1, wherein the non-linear sensitizer comprises bis(tributylphosphine) bis(4-ethynylbiphenyl)platinum, bis(tributylphosphine)bis(4-ethynyl-1-(2-phenylethynyl)benzene)platinum, bis(1-ethynyl-4-(4-n-butylphenylethynyl)benzene)bis(tri-n-butyl)phosphine)Pt (II), bis(1-ethynyl-4-(4-fluorophenylethynyl)benzene)bis (tri-n-butyl)phosphine)Pt(II), bis(1-ethynyl-4-(4-methoxyphenylethynyl)benzene) bis(tri-n-butyl)phosphine)Pt(II), bis(1-ethynyl-4-(4-methylphenylethynyl)benzene) bis(tri-n-butyl)phosphine)Pt (II), bis(1-ethynyl-4(3,5-dimethoxyphenylethynyl)benzene)bis(tri-nbutylphosphine)Pt(II), bis(1-ethynyl-4(4-N,N-dimethylaminophenylethynyl)benzene)bis (tri-n-butyl-phosphine)Pt(II), or combinations thereof.

12. The method of claim 1, wherein the non-linear sensitizer comprises bis(tributylphosphine) bis(4-ethynyl-1-methoxy benzene)platinum, bis(tributylphosphine) bis(4-ethynyl-1-fluoro benzene)platinum, bis(tributylphosphine) bis(4-ethynyl-1-methyl benzene)platinum, bis(tributylphosphine) bis(4-ethynyl-2,5-methoxy benzene)platinum, or combinations thereof.

13. The method of claim 1, wherein the latent chromophore is dispersed in the polymer matrix.

14. The method of claim 1, wherein the latent chromophore is bonded to the polymer matrix.

15. The method of claim 1, wherein the polymer matrix comprises polyvinylalcohol, poly(alkyl methacrylate), poly (alkyl acrylates, polystyrene, polycarbonate, poly acrylate, poly(vinylidene chloride), poly(vinyl acetate), or combinations thereof.

16. The method of claim 1, wherein the optical data storage medium further comprises a mediator capable of transferring triplet energy from the non-linear sensitizer to the latent acid generator.

17. The method of claim 1, wherein the latent acid generator is present in an amount in a range of from about 0.1 weight percent to about 10 weight percent of the optical data storage medium.

18. The method of claim 1, wherein the non-linear sensitizer is present in an amount in a range of from about 0.1 weight percent to about 10 weight percent of the optical data storage medium.

19. The method of claim 1, wherein the latent chromophore is present in an amount in a range of from about 20 weight percent to about 90 weight percent of the optical data storage medium.

20. The method of claim 1, further comprising a base, wherein the base is present in an amount in a range of from about 0.1 mole percent to about 10 mole percent of the latent acid generator in the optical data storage medium.

21. The method of claim 1, wherein the optical readable datum is capable of being read without substantial reaction at a wavelength of about 405 nanometers and at intensity lower than a threshold value.

22. A method for recording holographic data in an optical data storage medium, said method comprising:
(i) providing an optical data storage medium comprising: (a) a thermoplastic polymer matrix, (b) a latent acid generator, (c) a sequential two-photon non-linear sensitizer, and (d) a reactant comprising a protected benzophenone;
(ii) irradiating a volume element of the optical data storage medium with an interference pattern to cause sequential two-photon absorption by the non-linear sensitizer;
(iii) an upper triplet energy transfer from the non-linear sensitizer to the latent acid generator, thereby generating an acid,
said interference pattern comprising an incident radiation having a wavelength and an intensity sufficient to cause the upper triplet energy transfer, wherein the latent acid generator is substantially non-responsive to said incident radiation;
(iv) reacting a plurality of protected benzophenones with the acid generated to form a plurality of hydroxy benzophenones, thereby causing a refractive index change within the volume element; and
(v) producing within the irradiated volume element refractive index variations corresponding to the interference pattern, thereby producing an optically readable datum.

23. The optical data storage medium of claim 22, wherein a plurality of protected benzophenones are capable of forming a plurality of chromophores for each acid generated.

24. The optical data storage medium of claim 22, wherein the protected benzophenone comprises a moiety having a structural formula (I):

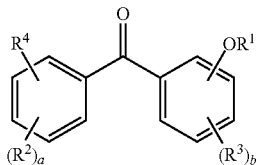

wherein "a" is an integer from 1 to 5 and "b" is an integer from 1 to 4;

$R^1$ is a protecting group;

$R^2$ and $R^3$ are independently at each occurrence hydrogen, halogen, a $C_1$-$C_{20}$ aliphatic radical, a $C_3$-$C_{20}$ cycloaliphatic radical, or a $C_2$-$C_{30}$ aromatic radical;

and $R^4$ is hydrogen or $OR^1$.

25. An optical data storage medium, comprising:

(a) a thermoplastic polymer matrix;

(b) a sequential two-photon non-linear sensitizer capable of absorbing incident radiation having a wavelength and an intensity sufficient to cause sequential two-photon absorption by the non-linear sensitizer;

(b) a latent acid generator capable of generating an acid upon upper triplet energy transfer from the non-linear sensitizer, and being substantially non-responsive to said incident radiation;

(d) a reactant comprising a latent chromophore, wherein at least one latent chromophore is capable of forming at least one chromophore by reacting with the acid generated, thereby causing a refractive index change in the optical data storage medium.

26. The optical data storage medium of claim 25, wherein the latent chromophore comprises a moiety having a structural formula:

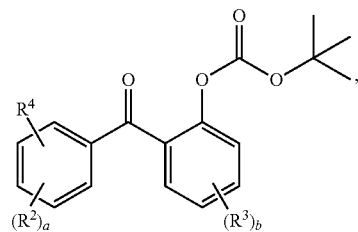

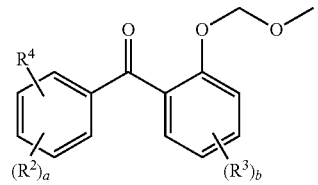

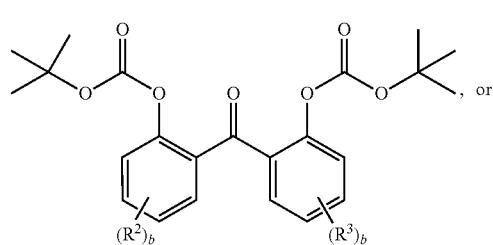

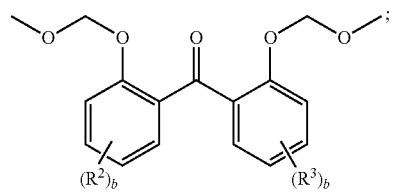

wherein "a" is an integer from 1 to 5 and "b" is an integer from 1 to 4;

$R^1$ is a protecting group;

$R^2$ and $R^3$ are independently at each occurrence hydrogen, halogen, a $C_1$-$C_{20}$ aliphatic radical, a $C_3$-$C_{20}$ cycloaliphatic radical, or a $C_2$-$C_{30}$ aromatic radical;

and $R^4$ is hydrogen or $OR^1$.

* * * * *